(12) United States Patent
Suaya et al.

(10) Patent No.: US 8,225,266 B2
(45) Date of Patent: Jul. 17, 2012

(54) MODELING THE SKIN EFFECT USING EFFICIENT CONDUCTION MODE TECHNIQUES

(75) Inventors: Roberto Suaya, Meylan (FR); Salvador Ortiz, Buenos Aires (AR)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/235,934

(22) Filed: Sep. 19, 2011

(65) Prior Publication Data

US 2012/0011485 A1    Jan. 12, 2012

Related U.S. Application Data

(62) Division of application No. 12/151,074, filed on May 2, 2008, now Pat. No. 8,024,692.

(60) Provisional application No. 60/927,745, filed on May 4, 2007.

(51) Int. Cl.
*G06F 17/50* (2006.01)
(52) U.S. Cl. ............... 716/132; 716/136; 703/2; 703/14
(58) Field of Classification Search .................. 716/132, 716/136; 703/2, 14
See application file for complete search history.

(56) References Cited

U.S. PATENT DOCUMENTS

| | | | |
|---|---|---|---|
| 5,313,398 A * | 5/1994 | Rohrer et al. ................... 703/14 |
| 6,088,523 A | 7/2000 | Nabors et al. |
| 6,606,586 B1 | 8/2003 | Ishikawa |
| 6,665,849 B2 | 12/2003 | Meuris et al. |
| 6,832,233 B2 | 12/2004 | Umeno |
| 6,847,925 B2 | 1/2005 | Ottusch et al. |
| 7,075,493 B2 * | 7/2006 | Azadegan et al. ............ 343/767 |
| 7,299,131 B2 | 11/2007 | Tabarovsky et al. |
| 7,558,706 B1 * | 7/2009 | Hoyler ............................... 703/2 |
| 7,720,651 B2 * | 5/2010 | Canning ........................... 703/2 |
| 7,889,945 B2 * | 2/2011 | Lyuboshenko ............... 382/276 |
| 8,024,692 B2 | 9/2011 | Suaya et al. |
| 2005/0015233 A1 | 1/2005 | Gordon |
| 2005/0198599 A1 | 9/2005 | Sercu et al. |
| 2006/0111860 A1 | 5/2006 | Trias |
| 2006/0232567 A1 | 10/2006 | Westerman et al. |
| 2006/0282492 A1 * | 12/2006 | Suaya et al. .................. 708/800 |
| 2007/0046369 A1 | 3/2007 | Schober et al. |

(Continued)

OTHER PUBLICATIONS

Berntsen et al., "An adaptive algorithm for the approximate calculation of Multiple Integrals," *ACM Trans. on Mathematical Software*, vol. 17, pp. 437-451 (Dec. 1991).

(Continued)

*Primary Examiner* — Naum Levin
(74) *Attorney, Agent, or Firm* — Klarquist Sparkman, LLP

(57) ABSTRACT

Described herein are embodiments of methods for extracting various high frequency parameters for a circuit design. In one exemplary embodiment, circuit design information indicating at least a geometric layout of conductors in the circuit design and a desired frequency of operation for the circuit design is received. Conduction modes representing distribution functions for currents in the conductors at the desired frequency of operation are defined. A conduction mode matrix including matrix elements based on the defined conduction modes is generated. Values for one or more matrix elements are computed by decomposing integrands for calculating the matrix elements into simplified terms that are less computationally intensive than the integrands and computing the values of the simplified terms. The values for the one or more matrix elements can be stored (e.g., on one or more computer-readable media).

16 Claims, 11 Drawing Sheets

U.S. PATENT DOCUMENTS

2010/0238407 A1    9/2010    Dai

OTHER PUBLICATIONS

Chew et al., *Fast and Efficient Algorithms in Computational Electromagnetics*, pp. 495-498 (Jul. 2001).

Daniel, "Simulation and Modeling Techniques for Signal Integrity and Electromagnetic Interference on High Frequency Electronic Systems," Ph.D. Dissertation, University of California at Berkeley, 204 pp. (2003).

Daniel et al., "Using Conduction Modes Basis Functions for Efficient Electromagnetic Analysis of On-Chip and Off-Chip Interconnect," *Design Automation Conf.*, pp. 563-566 (Jun. 2001).

Escovar et al., "An Improved Long Distance Treatment for Mutual Inductance," *IEEE Trans. on Computer Aided Design of Integrated Circuits and Systems*, vol. 24, No. 5, pp. 783-793 (May 2005).

Escovar et al., "Optimal design of clock trees for multi-gigahertz applications," *IEEE Trans. on Computer Aided Design of Integrated Circuits and Systems*, vol. 23, No. 3, pp. 329-345 (Mar. 2004).

Golub et al., *Matrix Computations*, 3$^{rd}$ Edition, pp. 69-79, 253 (1996).

Grover, *Inductance Calculations Working Formula and Tables*, pp. 1, 31-61 (1945).

Hu et al., "Analysis of Full-Wave Conductor System Impedance over Substrate using Novel Integration Techniques," *Design Automation Conf.*, pp. 147-152 (2005).

Hu et al., "Partitioned conduction modes in surface integral equation-based impedance extraction," *Electrical Performance of Electronic Packaging*, pp. 355-358 (Oct. 2003).

International Search Report dated Sep. 5, 2008, from International Application No. PCT/US08/62547).

Jackson, *Classical Electrodynamics*, pp. 144-149 (1962).

Kamon et al., "FASTHENRY: A Multipole Accelerated 3-D Inductance Extraction Program," *IEEE Trans. Microwave Theory Tech.*, vol. 42, No. 9, pp. 1750-1758 (Sep. 1994).

Lepage, "A New Algorithm for Adaptive Multidimensional Integration," 20 pp., (also published as Lepage, "A New Algorithm for Adaptive Multidimensional Integration," *Journal of Computational Physics*, vol. 27, pp. 192-203 (1978).

Nabors et al., "FastCap: A Multipole Accelerated 3-D Capacitance Extraction Program," *IEEE Trans. on Computer Aided Design*, vol. 10, No. 11, pp. 1447-1459 (Nov. 1991).

Ortiz, "Physical modelling of electromagnetic effects in IC interconnects," Ph.D. Dissertation, Universit Joseph Fourier, 241 pp. (2007).

Ortiz et al., "Efficient implementation of conduction modes for modelling skin effect," 6 pp. (also published as Ortiz et al., "Efficient implementation of conduction modes for modelling skin effect," *IEEE Int'l Symp. on VLSI*, pp. 500-505 (Mar. 2007)).

Ortiz et al., "Fullwave Volumetric Maxwell solver using Conduction Modes," *IEEE Int'l Conf. on Computer Aided Design*, pp. 13-18 (Nov. 2006).

Pang, "Integrated Thermal Design and Optimization Study for Active Integrated Power Electronic Modules (IPEMs)," MS Thesis, Virginia Polytechnic Institute and State University, 166 pp. (Aug. 26, 2002).

Press et al., *Numerical Recipes: The Art of Scientific Computing*, pp. 121-130 (1986).

Suaya et al., "Interconnect modeling and extraction in nanometer design," *Advanced Metalisation Conf.*, 11 pp. (Oct. 2006).

Zhao et al., "Integral Equation Solution of Maxwell's Equations from Zero Frequency to Microwave Frequencies," *IEEE Trans. on Antennas and Propagation*, vol. 48, pp. 1635-1645 (Oct. 2000).

Zhu et al., "Algorithms in FastImp: A Fast and Wide-Band Impedance Extraction Program for Complicated 3-D Geometries," *IEEE Trans. on Computer Aided Design*, vol. 24, pp. 981-998 (Jul. 2005).

\* cited by examiner

| Type | Conditions | $X_{ovlp}$ | $W_{ovlp}$ | Configuration | Decomposition |
|---|---|---|---|---|---|
| 1 | $X_1 < X_2$<br>$X_1+W_1 < X_2+W_2$ | $X_2$ | $W_1+X_1-X_2$ | | |
| 2 | $X_1 < X_2$<br>$X_1+W_1 > X_2+W_2$ | $X_2$ | $W_2$ | | |
| 3 | $X_1 > X_2$<br>$X_1+W_1 < X_2+W_2$ | $X_1$ | $W_2$ | | |
| 4 | $X_1 > X_2$<br>$X_1+W_1 > X_2+W_2$ | $X_1$ | $W_2+X_2-X_1$ | | |

FIG. 10

MODELING THE SKIN EFFECT USING EFFICIENT CONDUCTION MODE TECHNIQUES

CROSS REFERENCE TO RELATED APPLICATION

This application is a divisional of U.S. patent application Ser. No. 12/151,074, filed May 2, 2008, now U.S. Pat. No. 8,024,692, which claims the benefit of U.S. Provisional Application No. 60/927,745 filed May 4, 2007, both of which are hereby incorporated herein by reference.

FIELD

This application pertains generally to the field of analyzing the electrical characteristics of circuit designs. For example, embodiments of the disclosed technology can be used to perform parasitic extraction in a physical verification software tool.

BACKGROUND

In many high-frequency technology sectors (e.g., radio frequency integrated circuits (RFIC), high performance microprocessors, and advanced telecommunication packages), significant changes in wire impedance can be observed when compared to lower frequency applications. Increases in resistance (e.g., by a factor of two) and the emergence of frequency-dependent inductance effects that eventually become the dominant contribution to impedance are manifestations of the rising importance of time-dependent magnetic fields on the current distribution within conductors. The threshold beyond which wire impedance is desirably treated as a nontrivial computable function of frequency varies from technology sector to technology sector. This phenomena is better understood when expressed in terms of the skin depth $\delta$:

$$\delta = \frac{1}{\sqrt{\pi \mu \sigma f}}, \quad (1)$$

where $\sigma$ is the conductivity inside the conductor, $\mu$ is the magnetic permittivity (usually that of the vacuum) and f is the frequency of operation. The skin depth is an approximate measure of the distance from the surface of a conductor that an external magnetic field can penetrate. As the frequency increases, the wire's minimum transverse dimensions become larger than $\delta$, triggering the onset of frequency dependence in the electromagnetic parameters resistance R and inductance L. This happens at hundreds of MHz for packages, at a few GHz for passive on-chip devices, and in the neighborhood of 15 GHz for upper metal layer signals in ICs with 65 nm features sizes. For future process generations timing considerations, rather than scaling, will dictate the choice of critical wire transverse dimensions and with that, the resulting threshold frequencies.

In R. Escovar and R. Suaya, "Optimal design of clock trees for multi-gigahertz applications," *IEEE Transactions on CAD*, vol. 23, March 2004, pp. 329.345; R. Escovar, S. Ortiz, and R. Suaya, "An improved long distance treatment for mutual inductance," *IEEE Trans. Computer-Aided Design*, vol. 24, no. 5, pp. 783.793, May 2005; U.S. Patent Application Publication Nos. 2003/0131334, 2005/0120316, 2006/0282492, 2007/0225925, and 2007/0226659, all of which are hereby incorporated herein by reference, methods for extracting distributed frequency dependent electromagnetic parameters for wires in ICs are described. Some of the methods are based on correctly determining the loop impedance, and using sound physical considerations to identify what constitutes the return path. Once the return paths have been identified, the loop wire impedance is computed from solutions to Kirchhoff's current laws. The correct frequency behavior for inductance and resistance can then be reproduced, in terms of uniform current distribution for each wire. The solution to Kirchhoff's current laws is computationally efficient for frequencies below the skin depth, permitting full-chip dynamic impedance extraction at a reasonable computational cost up to about 15 GHz for 65 nm technologies. At higher frequencies, one can partition the wire into filaments to account for the nonuniformity of current distribution, resulting in an enlarged linear system whose order becomes mN with m being the number of filaments per wire and N being the number of wires. In certain embodiments, around 1000 wires/second can be processed for frequencies which are below the skin effect threshold. Above the skin effect threshold, it is desirable to set m~10 for a typical wire in order to achieve better than 1% accuracy in impedance extraction over a broad frequency domain (e.g., from about 15 Ghz up to about 100 Ghz). Using direct solvers, the computational performance drops to 1 wire per second, making the approach too expensive for all but selected critical wires. Accordingly, improved and computationally efficient methods for extracting electrical parameters for circuits operating at higher frequencies are desired.

SUMMARY

Described herein are embodiments of methods for extracting various high frequency parameters for a circuit design. In specific embodiments, exemplary methods for capturing frequency dependent effects due to current crowding are described. Embodiments of the method comprise decomposing the current density inside the conductors into a set of functions, called conduction modes (CM), which are defined as eigenmodes of the Helmholtz equation. Conduction modes capture the characteristic order $\delta$ exponential decay of currents and fields from the surface of conductors inward. One possible advantage that can be realized using embodiments of the disclosed technology involves the reduction of the size of the linear system representing the currents.

When moving from filament decompositions to gridless conduction modes, the focus of the computations is shifted from handling a large linear system into computing each of the matrix elements in the resulting conduction mode matrix. In the CM method, one computational issue to address is computing non-trivial 2-d (3-d for RLC) integrals that involve kernels containing integrable singularities. In comparison, for the filament decomposition approach, the matrix elements are easily computable. Using standard off-the-shelf numerical approaches for computing these integrals does not transform the savings in the size of the linear system into savings in computational cost. To achieve better computational efficiency with the CM approach, and as described herein, domain specific knowledge regarding the integrands and boundaries can be used. Using embodiments of the disclosed technology, the number of calls to the integrands can be reduced by over two orders of magnitude when compared with the aforementioned off-the-shelf approaches. The same two orders of magnitudes are obtained in comparison to filament decomposition methods.

In certain exemplary embodiments described herein, circuit design information indicating at least a geometric layout of conductors in the circuit design and a desired frequency of operation for the circuit design is received. Conduction modes representing distribution functions for currents in the conductors at the desired frequency of operation are defined. A conduction mode matrix including matrix elements based on the defined conduction modes is generated. Values for one or more matrix elements are computed by decomposing integrands for calculating the matrix elements into simplified terms that are less computationally intensive than the integrands and computing the values of the simplified terms. The values for the one or more matrix elements can be stored (e.g., on one or more computer-readable media). In particular implementations, impedance values are computed for each of the conductors by solving a matrix equation that includes the conduction mode matrix. In some embodiments, the act of computing the values for the matrix elements further comprises computing values for matrix elements corresponding to same conductor integrands using a first set of simplified terms and computing values for matrix elements corresponding to different conductor integrands using a second set of simplified terms, the second set of simplified terms being different than the first set of simplified terms. In certain embodiments, the act of computing the values for the matrix elements further comprises classifying a selected one of the matrix elements as corresponding to either: (a) an integrand having an exponential contribution along a first integration axis and an exponential contribution along a second integration axis; (b) an integrand having a linear contribution along a first integration axis and an exponential contribution along a second integration axis; or (c) an integrand having a linear contribution along a first integration axis and a linear contribution along a second integration axis. In particular implementations, the selected one of the matrix elements is classified as an integrand having a linear contribution along a first integration axis and an exponential contribution along a second integration axis, and the act of computing values for the matrix elements further comprises applying a first type of simplified term to the selected one or more of the matrix elements to compute the exponential contribution and applying a second type of simplified term to the selected one or more of the matrix elements to compute the linear contribution. In some embodiments, the simplified terms for one or more matrix elements include any one or more of terms based on Gaussian quadrature rules, terms derived by applying a polar coordinate system to the corresponding integrand of the one or more matrix elements, Taylor expansions, or polynomial approximations. Further, in certain embodiments, at least some of the computed values for the one or more matrix elements are assigned to other matrix elements based on conduction mode symmetries. In some embodiments, the act of defining conduction modes comprises defining one or more additional effective conduction modes for a respective conductor based on whether the width of the respective conductor causes a threshold value to be met. For instance, the threshold value can be a ratio between the width of the respective conductor and an amount the respective conductor overlaps with another conductor.

In other disclosed embodiments, circuit design information indicating at least a geometric layout of conductors in the circuit design and a desired frequency of operation for the circuit design is received. Conduction modes representing distribution functions for currents in the conductors at the desired frequency of operation are defined. A conduction mode matrix including matrix elements based on the defined conduction modes is generated. Values for one or more matrix elements are computed by decomposing integrands for calculating the matrix elements into simplified terms that are less computationally intensive than the integrands and computing the values of the simplified terms. Impedance values are computed for each of the conductors using the values of the simplified terms. A circuit design can be modified based at least in part on the computed impedance values. An integrated circuit can be manufactured from the circuit design.

In other exemplary embodiments disclosed herein, circuit design information indicating at least a geometric layout of conductors in the circuit design and a desired frequency of operation for the circuit design is loaded. Conduction modes representing distribution functions for currents in the conductors at the desired frequency of operation are defined. A conduction mode matrix including matrix elements based on the defined conduction modes is generated. The matrix elements comprise matrix elements corresponding to same conductor integrands and matrix elements corresponding to different conductor integrands. Values for one or more of the matrix elements corresponding to same conductor integrands are computed using a first set of terms, and values for one or more of the matrix elements corresponding to different conductor integrands are computed using a second set of terms, the second set of terms being different than the first set of terms. The values for the one or more of the matrix elements corresponding to same conductor integrands and the values for the one or more of the matrix elements corresponding to different conductor integrands can be stored (e.g., on one or more computer-readable media). In some embodiments, the method further comprises computing impedance values for each of the conductors by solving a matrix equation that includes the conduction mode matrix. In certain embodiments, the first set of terms comprises terms that result from decomposing the same conductor integrands into approximations. The second set of terms can also comprise terms that result from decomposing the different conductor integrands into approximations. The first set of terms can include any one or more of terms based on Gaussian quadrature rules, terms derived by applying a polar coordinate system, or terms corresponding to a polynomial interpolation. The second set of terms can include any one or more of terms based on Gaussian quadrature rules, terms corresponding to Taylor expansions, or terms corresponding to a polynomial interpolation. In certain embodiments, at least some of the computed values for the one or more of the matrix elements corresponding to same conductor integrands are assigned to other matrix elements based on conduction mode symmetries.

In further embodiments described herein, information for a circuit design indicating at least a geometric layout of conductors in the circuit design and a desired frequency of operation for the circuit design is received. A conduction mode matrix of matrix elements is generated in which each matrix element corresponds to a respective conduction mode integrand that at least partially represents the distribution of currents within a respective conductor at the desired frequency of operation. A value for a respective one of the matrix elements is computed by computing one or more linear contributions to the respective conduction mode integrand separately from one or more exponential contributions to the respective conduction mode integrand. The value for the respective one of the matrix elements can be stored (e.g., on one or more computer-readable media). In certain embodiments, the act of computing the value for the respective one of the matrix elements further comprises identifying the respective conduction integrand for the respective one of the matrix elements as either: (a) an integrand having an exponential contribution along a first integration axis and an exponential contribution along a second integration axis; (b) an integrand having a linear contribution along a first integration axis and an exponential contribution along a second integration axis; or (c) an integrand having a linear contribution along a first integration axis and a linear contribution along a second integration axis. In some embodiments, the exponential contributions to the respective conduction mode integrand are computed using any one or more of terms based on Gaussian quadrature rules, terms corresponding to Taylor expansions, or terms corresponding to polynomial approximations. Further, in certain embodiments, the linear contributions to the respective conduction mode integrand are computed using any one or more of terms based on Gaussian quadrature rules, terms corresponding to a polynomial interpolation, terms derived by applying a polar coordinate system to the respective conduction mode integrand, or terms corresponding to Taylor expansions.

Any of the disclosed methods can be implemented as a computer program, such as an electronic-design-automation (EDA) software tool comprising computer-executable instructions stored on one or more computer-readable media. All such media are considered to be within the scope of this disclosure. Any of the disclosed methods implemented in a computer environment can also be performed by a single computer or via a network. Any of the disclosed methods can be used to generate and store one or more data structures or databases (e.g., a Spice or Spice-type netlist) having impedance information (or intermediate impedance information) determined using any of the disclosed methods. All such data structures and databases (stored, for example, on one or more computer-readable media) are considered to be within the scope of this disclosure. The disclosed methods can also be used at least in part to modify or design a circuit represented as circuit design information stored on a computer-readable medium. The circuit design information can comprise, for example, a circuit design file (such as a GDSII or Oasis file). All such types of circuit design information are considered to be within the scope of this disclosure.

The foregoing and other objects, features, and advantages of the invention will become more apparent from the following detailed description, which proceeds with reference to the accompanying figures.

BRIEF DESCRIPTION OF THE DRAWINGS

FIG. 10 is a schematic block diagram illustrating various overlapping configurations that may be decomposed according to one exemplary embodiment of the disclosed technology.

DETAILED DESCRIPTION

I. General Considerations

Figure 1:
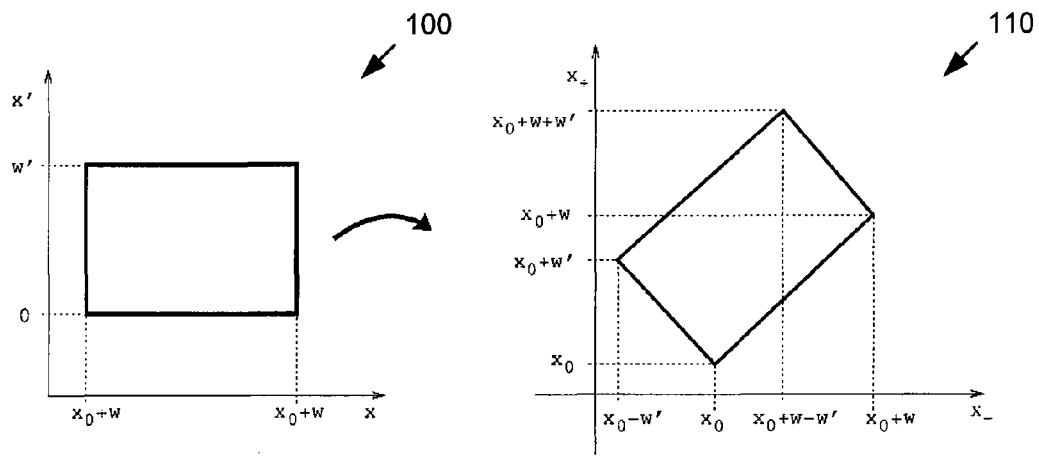
FIG. 1 illustrates an exemplary change of variables for x-integration as used in one embodiment of the disclosed technology.

Disclosed below are representative embodiments of methods that can be used when extracting impedance in a circuit design. The disclosed methods should not be construed as limiting in any way. Instead, the present disclosure is directed toward all novel and nonobvious features and aspects of the various disclosed embodiments, alone and in various combinations and subcombinations with one another. The methods are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art.

The disclosed technology can be used, for example, to analyze impedance effects on digital, analog, or mixed-signal integrated circuits. The disclosed technology can be applied, for example, to any circuit or situation where parasitic impedance effects may affect signal delay or signal integrity or power consumption. For instance, the disclosed embodiments can be used to analyze the high-frequency behavior of wires or interconnect in an integrated circuit design (e.g., an application-specific integrated circuit (ASIC), a programmable logic device (PLDs) such as a field programmable gate array (FPGA), a system-on-a-chip (SoC), or a microprocessor) or in the off-chip interconnect at the board or package level (e.g., multilayered packages or printed circuit boards).

Any of the disclosed methods can be implemented as computer-executable instructions stored on a computer-readable medium and executed on a computer. Such instructions can be part of, for example, an electronic-design-automation (EDA) software tool used, for instance, for physical verification or synthesis. Such software can be executed on a single computer (e.g., any suitable commercially available computer) or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For the same reason, computer hardware is not described in detail.

Further, any of the disclosed methods can be used to generate a representation of the electrical characteristics of a circuit, such as a Spice or Spice-like netlist. Any of the disclosed methods can also be used to modify or design a circuit represented as circuit design information stored on computer-readable media. The circuit design information can comprise, for example, one or more design files or data structures (such as a GDSII or Oasis file) and can be created or modified on a single computer or via a network. Additionally, impedance information or any intermediate information determined using any of the disclosed methods (e.g., conduction mode matrix elements, results from the simplified terms, and so on) may be stored in one or more data structures or design databases stored on computer-readable media. Such impedance information or intermediate information can be accessed through a variety of communication means, including for example the Internet, the World Wide Web, an intranet, software applications, cable, magnetic, electronic communications, or other communications means.

The disclosed methods can be used at one or more stages of an overall synthesis scheme. For example, any of the inductance extraction methods disclosed can be used during physical synthesis (e.g., during the physical verification process) in order to evaluate and improve a circuit design. Circuits manufactured from such circuit designs are also considered to be within the scope of this disclosure. For example, after synthesis is performed using embodiments of the disclosed methods, the resulting circuit design can be fabricated into an integrated circuit using known microlithography techniques.

Any of the disclosed methods can be used to compute impedance effects in a computer simulation, physical verification tool, or other electronic design automation (EDA) environment wherein the impedance in a circuit representation is analyzed. For example, the disclosed methods typically use circuit design information (for example, a netlist, HDL description (such as a Verilog or VHDL description), GDSII description, Oasis description, or the like) stored on computer-readable media. For presentation purposes, however, the present disclosure sometimes refers to the circuit and its circuit components by their physical counterpart (for example, wires, conductors, paths, and other such terms). It should be understood, however, that any such reference not only includes the physical components but also representations of such circuit components as are used in simulation, physical verification, or other such EDA environments.

As used in this disclosure and the claims, the singular forms "a," "an," and "the" include the plural forms unless the context clearly dictates otherwise. Additionally, the term "includes" means "comprises."

Any of the disclosed embodiments can be used with the techniques described in U.S. Patent Publication No. 2007/0225925, entitled "Extracting High Frequency Impedance in a Circuit Design Using an Electronic Automation Tool" and filed Feb. 8, 2007, or U.S. Patent Publication No. 2007/0226659, entitled "Extracting high frequency impedance in a circuit design using broadband representations" and filed Feb. 8, 2007, both of which are hereby incorporated herein by reference.

II. Conduction Modes, Generally

This discussion of conduction modes starts with a formal solution to the three dimensional Maxwell's equations. The exemplary solution discussed here is in the Lorenz gauge, with the conductors immersed in a homogeneous lossless dielectric, incorporates Ohms law and the continuity equation resulting from charge conservation, and involves computations on the Fourier representation. An MPIE (Mixed Potential Integral Equation) representation of the field E(r) is used in terms of the gradient of the scalar electric potential $\varphi$ and the time derivative of the magnetic vector potential A(r). The unknown quantities are the currents in the interior of the conductors (note that in the disclosed embodiments, only RL cases are described), which are governed by the integral equations:

$$\frac{J(r)}{\sigma} + \frac{j\omega\mu_0}{4\pi}\int_V J(r')\frac{e^{-jk_0|r-r'|}}{|r-r'|}d^3r' = -\nabla\varphi(r), \quad (2)$$

where $k_0 = \omega\sqrt{\epsilon\mu_0} = 2\pi/\lambda$ is the wave number, and V is the union of all conductor volumes $V_i$. Ohm's law has been used in replacing the total E in the conductor by $J(r)/\sigma$, and the Green function exp $(-jk_0|r-r'|)/|r-r'|$ corresponds to the Lorenz gauge.

In (2), only the current equations are retained, since this discussion is focused on the RL problem. (The fullwave versions of the equations in this section are discussed in S. Ortiz and R. Suaya, "Fullwave volumetric Maxwell solver using conduction modes," *IEEE International Conference on Computer Aided Design (ICCAD)*, November 2006, which is hereby incorporated herein by reference.)

The vector current density J can be expanded in terms of a set of functions $w_i(r)$, i=1 . . . N defined on the conductors' volumes. For compactness of the notation, the dependence on the conductor as well as the particular mode is absorbed into the single index i. The total number N is the sum of modes over all conductors:

$$J(r) \approx \sum_{j=1}^{N} I_j w_j(r). \quad (3)$$

To determine the coefficients $I_i$ on this expansion, the Galerkin method of moments is used, whereby $J(r)$ in Expression (3) is replaced by Expression (2), and a functional inner product is performed with $w_i(r)$, with the requirement that the residuals be orthogonal to the basis functions. The resulting equations are represented by an $N^2$ linear system:

$$[R+j\omega L][I] = -[V], \quad (4)$$

with the matrix elements given by:

$$R_{ij} = \frac{1}{\sigma}\int_V w_i^*(r)\cdot w_j(r)d^3r \quad (5)$$

$$L_{ij} = \frac{\mu_0}{4\pi}\int_V\int_V w_i^*(r')w_j(r)\frac{e^{-jk_0|r-r'|}}{|r-r'|}d^3r\,d^3r',$$

with the subindices i,j ranging from 1 to N. The volume V is the collection of all the conductors' volumes. In particular, a collection of three and six dimensional integrals is to be performed. The voltage drops on the right-hand side (rhs) of Expression (4) is given by:

$$\langle w_i, \nabla \phi \rangle = \int_V \nabla \phi \cdot w_i^* d^3 r \quad i=1 \ldots N. \tag{6}$$

The effectiveness of the method will be assessed by the level of precision that can be obtained using a relatively small number of modes for each conductor in $w_i(r)$, and the difficulty associated with computing the integrals in Expression (5).

Modeling currents with conduction modes corresponds to making a particular choice for the expansion function basis $w_i$, namely that of eigenfunctions to the homogeneous vector Helmholtz equation satisfied by the current density J inside the conductors, $$(\nabla^2 + \kappa^2) J(r) = 0 \tag{7}$$

with $\kappa^2 = -k_0^2 + \dfrac{j}{\delta^2}$.

This equation is the differential form of the MPIE shown in Expression (2).

The RL conduction mode eigenfunctions are 1-D, the z direction is understood as the direction of propagation, with the spatial dependence perpendicular to the current flow with exponential decays from a side or corner of the cross-section:

$$w_i(r) = \begin{cases} \hat{z} A_i e^{-[\alpha_i(x-x_i) + \beta_i(y-y_i)]} & \text{if } r \in V_{n_i} \\ 0 & \text{else,} \end{cases} \tag{8}$$

with $$\alpha_i^2 + \beta_i^2 = -\left(\frac{2\pi}{\lambda}\right)^2 + \left(\frac{1+j}{\delta}\right)^2, \tag{9}$$

where $x_i, y_i$ indicate the corner, on the cross section, from which the conduction mode decays. If either $\alpha=0$ or $\beta=0$, then the conduction mode is called a "side mode," either vertical or horizontal; otherwise, it is a corner mode.

Since, $\delta \ll \lambda$, the first term in the right-hand side of Expression (9) can be neglected. For the rhs of Expression (4), the above approximation leads to:

$$\langle w_i, \nabla \varphi \rangle = \int_{V_i} \frac{\partial \varphi(z)}{\partial z} w_i^*(x,y) \, dr = \int_{V_i} \frac{\partial \varphi}{\partial z} dz = \varphi(L) - \varphi(0), \tag{10}$$

with $w_i$ being normalized as: $\int w_i(x,y) \, dx dy = 1$ integrated over the cross section of the conductor.

III. Calculation of Matrix Elements

In this section, the calculation of the matrix elements $L_{ij}$ represented in Expression (5) is shown in detail according to an exemplary embodiment of the disclosed technology. The matrix elements consist of 6-dimensional integrals of the type:

$$L_{i,j} = \int_V \int_{V'} \frac{e^{-jk_0|r-r'|}}{|r-r'|} e^{\alpha_i^* x + \alpha_j x'} e^{\beta_i^* y + \beta_j y'} d^3 r \, d^3 r', \tag{11}$$

where V, V' refer to the volumes of two conductors while i and j refer to CM modes.

Furthermore, the exemplary method proceeds in the RL MagnetoQuasiStatic (MQS) domain, in which short conductors compared to $\lambda$ in the medium are considered. It is then safe to set $k_0=0$ in the above expression. The matrix L is hermitian, hence only $N(N+1)/2$ of the total $N^2$ integrals need to be computed with N being the total number of conduction modes. N is typically mn, where n and m are the number of conductors and the typical number of modes per conductor, respectively. It should be noted that the value of N may change somewhat depending on the actual conductors considered because not all conductors necessarily have the same number of modes.

A source of classification of these integrals that can be used in certain desirable embodiments of the disclosed technology is based on whether the two volumes cover the same or different conductors. For example, When both volumes cover the same conductor, there is a higher degree of symmetry, allowing for savings in the number of terms computed, while the integration domain contains an integrable singularity at zero separation and can be treated specially.

When both V, V' refer to different conductors, the integrand is regular within the full integration domain, thus permitting the use of Taylor expansions.

In the following sections, some commonalities in an exemplary integration strategy applicable to both domains are discussed, followed by a detailed analysis that relies on the above-mentioned classification scheme.

One possible simplification results from the observation that, except for the exponentials representing each conduction mode, the variables enter in the combination x-x', y-y', z-z' as expected because they represent the Green function to a linear system. A change of variables, as illustrated by graphs 100 and 110 in FIG. 1, can be applied:

$$\begin{cases} r_+ = r + r' \\ r_- = r - r', \end{cases} \tag{12}$$

with $r=(x,y,z)$, and the Jacobian for the transformation is $\frac{1}{2}$.

In the new variables, the integrals over $x_+, y_+, z_+$ are performed analytically, obtaining:

$$L_{i,j} = \frac{1}{8} \int_{x_0-w'}^{x_0+w} \int_{y_0-h'}^{y_0+h} \int_{z_0-L'}^{z_0+L} \frac{\xi_x(x_-)\xi_y(y_-)\xi_z(z_-)}{r} dx_- dy_- dz_-, \tag{13}$$

where $r = \sqrt{x_-^2 + y_-^2 + z_-^2}$ and the functions $\xi_{x,y,z}$ are the result of the analytical integrals. These depend on the type of conduction modes, and reflect the integration domain for the variables in graph 110 of FIG. 1. The behavior for the x integral is shown below, the rest being derivable in a similar fashion:

$$\xi_x(x) = \begin{cases} w + w' - |x - x_0| - |x - x_1| & \text{if } \alpha_i^* + \alpha_j = 0 \\ (\gamma_1 e^{\alpha_i^* x} + \gamma_2 e^{-\alpha_j x})(\alpha_i^* + \alpha_j)^{-1} & \text{if } \alpha_i^* + \alpha_j \neq 0, \end{cases} \tag{14}$$

with $x_1 \equiv x_0 + w - w'$, and the piecewise-constant functions:

$\gamma_1 \equiv e^{(\alpha_i^* + \alpha_j)w'} \theta(x_1 - x) - \theta(x - x_0)$, $\gamma_2 \equiv e^{(\alpha_i^* + \alpha_j)w} \theta(x - x_1) - \theta(x_0 - x)$ ($\theta(x)$ is the Heaviside step function). For $\xi_y(y)$, $\alpha$ is replaced by $\beta$ and $x_{0,1}$ by $y_{0,1}$. The product of the three $\xi$ functions act as a weight for the Coulomb $r^{-1}$ term. For RL-MQS, the z-integral can be done analytically leading to:

$$L_{i,j} = \int_{x_0-w'}^{x_0+w} \int_{y_0-h'}^{y_0+h} \xi_x(x)\xi_y(y)F(\rho(x, y))\,dx\,dy, \quad (15)$$

with $\rho(x, y) = \sqrt{x^2+y^2}$ and $F(\rho)$ is a cumbersome expression, which in the case of both conductors sharing the z-extension, is:

$$F = L\left(\sinh^{-1}\left(\frac{L}{\rho}\right) - \sqrt{1+\frac{\rho^2}{L^2}} + \frac{\rho}{L}\right), \quad (16)$$

with L the common length of the conductors. In the general case it is a combination of similar expressions evaluated at four different z-values.

This procedure results in two dimensional integrands, which can be classified according to the different weight functions. For example, each conduction mode can either be a "corner" (both $\alpha,\beta\neq 0$) or a "side" mode (only one non-zero conduction mode parameter). Therefore, any integrand can contain 0, 1 or 2 exponential decays along each of the cross-sectional dimensions. In certain embodiments, the integrands can be classified according to the following types:

[H,V] (or [V,H]): One horizontal side mode and one vertical side mode. The corresponding integrand has one exponentially decaying contribution along each integration axis.

[H,H] (or [V,V]): Two horizontal (or vertical). The corresponding integrand has two exponentially decaying contributions along one axis, and none along the other.

[H,C] (or [C,H] [V,C] [C,V]): One corner mode and one side mode (in any combination). The corresponding integrand has two exponentially decaying contributions along one axis, and one along the other.

[C,C]: Two corner modes. The corresponding integrand has two exponentially decaying contributions along each axis.

For any of the two integration variables, x or y, the number of exponentially decaying functions on that variable can determine the contribution of this integration variable to the total integral. Rearranging expressions in Expression (14), each integral can be decomposed into terms that have a definite behavior (exponential or linear) along each axis. In Table 1, a representative set identifying the dimensions of the different sub-domains is shown for each type of integral described above. Straightforward extensions to the other integrals of the same type are omitted for the sake of brevity.

TABLE 1

Decomposition of the total integration domain into exponential (E) and linear (L) contributions along the x and y integration coordinates (e.g.: E-L is exponential in x, linear in y), for different types of integrals.

| Type | [H, V] | [H, H] | [H, C] | [C, C] |
|------|--------|--------|--------|--------|
| E-E  | Wh'    | —      | (w + w')h' | (w + w')(h + h') |
| L-E  | w'h'   | —      | —      | —      |
| E-L  | wh     | (w + w')(h + h') | (w + w')h | —      |
| L-L  | w'h    | —      | —      | —      |

This decomposition permits application of appropriate methods of integration according to the functional behavior of the integrand, as well as the integration domain.

A. Same Conductor Integration Domains

In general, the overall cost of computing same-conductor integrals is smaller than that of computing the different conductor integrals. This is due, mainly, to the number of corresponding matrix elements being much smaller than the number of different-conductor matrix elements. For example, if there are n conductors with m the number of conduction modes per conductor, then there are $nm^2$ same-conductor elements while there are $(n^2-n)m^2$ different-conductor matrix elements. Due to hermiticity, the number of integrals to be computed reduces to:

$$N_{same} = \frac{1}{2}n(m^2 + m) \quad (17)$$

$$N_{diff} = \frac{1}{2}(n^2 - n)m^2.$$

Given that for most IC applications, m values are reasonably independent of n and small, $N_{diff}$ is significantly larger than $N_{same}$. The quadratic growth of $N_{diff}$ with n is the dominant contributions for configurations containing three or more conductors.

Figure 2:
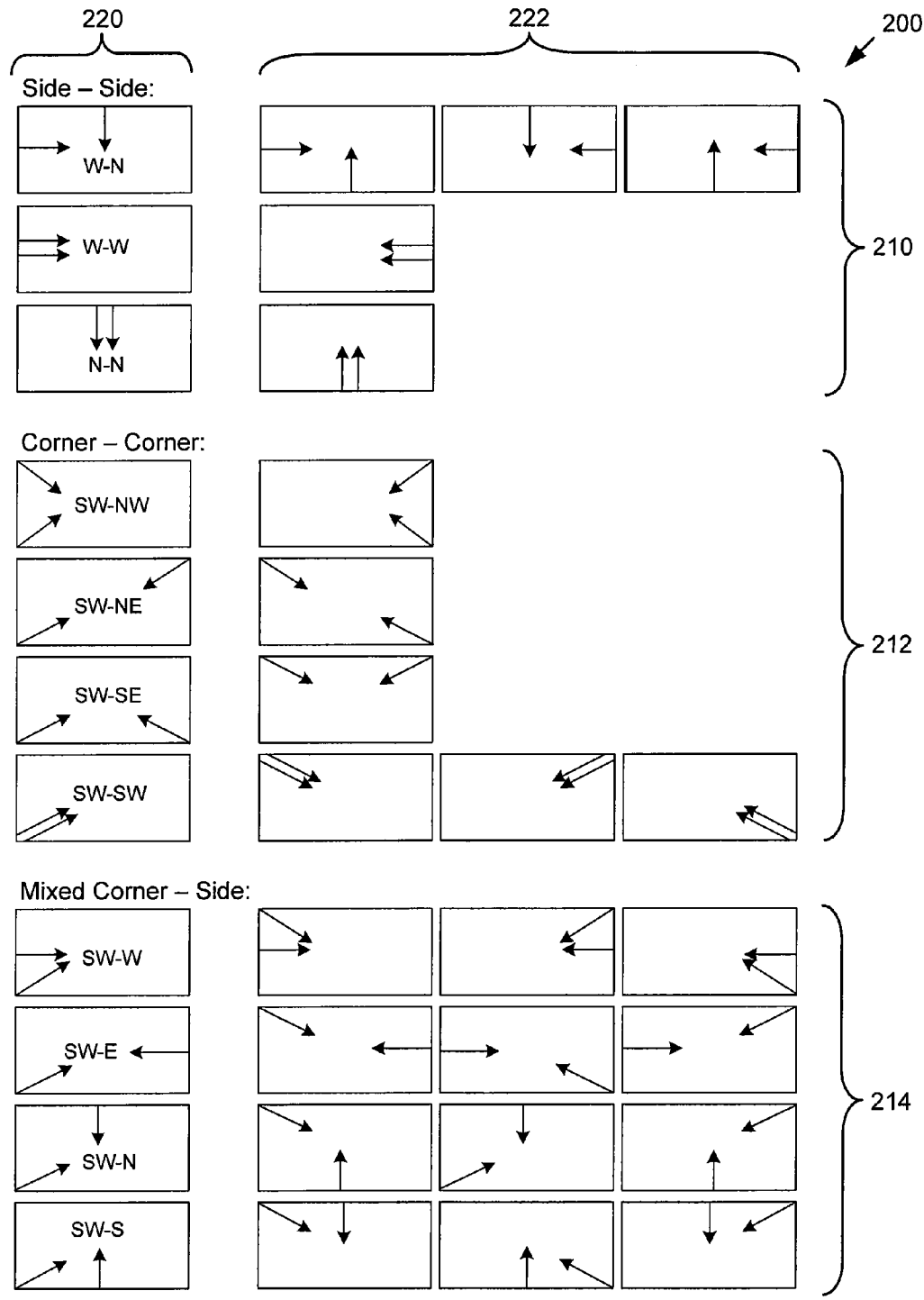
FIG. 2 is a diagram illustrating exemplary mode equivalencies for same-conductor integrals.

Furthermore, symmetries can be used to further reduce the number of independent contributions to $N_{same}$. FIG. 2 is a schematic block diagram 200 illustrating examples of mode equivalences for same-conductor integrals. In particular, the modes shown in region 220 have equivalent modes shown in region 222. Furthermore, region 210 shows equivalencies for conductors have two side modes, region 212 shows equivalencies for conductors having two corner modes, and region 214 shows equivalencies for conductors having mixed corner and side modes.

According to one exemplary embodiment, and applying these mode equivalencies:

For a conductor containing four side modes, only 5 integrals (out of 10) are computed, namely: (E,E) (E,W) (N,N) (N,S) (E,N).

For a conductor containing four corner modes, only 4 integrals (out of 10) are computed, namely: (NE,NE) (NE, NW) (NE,SE) (NE,SW).

For a conductor containing four side modes and four corner modes, only 4 mixed integrals (out of 16) are computed, namely: (E,NE) (E,NW) (N,NE) (N,SE).

In order to compute each of the $N_{same}$ integrals, and according to one exemplary embodiment, different strategies for each type of integral can be adopted.

1. Terms with Exponential Decay

In certain exemplary embodiments, for the [H,H] integrals, the domain collapses to $x\in[0, w]$; $y\in[0, h]$ wherein the weight functions can be expressed as:

$$\xi_x = \begin{cases} 2\cos\left(\frac{x}{\delta}\right)\left(e^{-\frac{x}{\delta}} - e^{-\frac{2w-x}{\delta}}\right) & (E, E) \\ 2j\sin\left(\frac{w-x}{\delta}\right)\left(e^{-\frac{w-x}{\delta}} + e^{-\frac{w+x}{\delta}}\right) & (E, W), \end{cases} \quad (18)$$

$$\xi_y = h - y$$

with the first line for $\xi_x$ refers to modes decaying from the same side, while the second line is for modes decaying from opposite sides.

In one exemplary embodiment, Gaussian quadrature rules are applied for each axis, taking into account that for the y-axis, the linear weight is replaced by a Gauss-Jacobi quadrature (see, e.g., W. H. Press, B. P. Flannery, S. A. Teukolsky, and W. T. Vetterling, *Numerical Recipes: The Art of Scientific Computing*, 1st ed. Cambridge (UK) and New York: Cambridge University Press, 1986) ("Press et al.")), $$\int_{-1}^{1} (1-x)^a (1+x)^b f(x) dx \simeq \sum_{i=1}^{G_{jac}} w_i^J f(x_i^J). \qquad (19)$$

By setting a=1, b=0 and doing a linear shift in y for $x_i$ in (18), the following can be obtained:

$$\int_{0}^{h} (h-y) F(x,y) dy \simeq \frac{h^2}{4} \sum_{i=1}^{G_{jac}} w_i^J F\left(x, \frac{h}{2}(x_i^J + 1)\right). \qquad (20)$$

On the other hand, the exponential decays $\xi_x$-in (18) are represented by a Gauss-Laguerre quadrature. See, e.g., Press et al. For the latter, and according to one exemplary embodiment, the rule can be designed to estimate [0,∞] integrals, $$\int_{0}^{\infty} e^{-x} f(x) dx \simeq \sum_{i=1}^{G_{Lag}} w_i f(x_i^L). \qquad (21)$$

Therefore, using integration by parts, each of the integrals is replaced by two quadratures, $$\int_{0}^{w} e^{-\frac{x}{\delta}} f(x) dx \simeq \sum_{i=1}^{G_{Lag}} w_i \left( f(\delta x_i^L) - e^{-\frac{w}{\delta}} f(\delta(x_i^L + w)) \right). \qquad (22)$$

Gauss-Laguerre rules are also used for the exponential contributions in the [H,C] or [C,C] integral types. In practice, it has been observed that $G_{lag} \simeq 40$, $G_{jac} \simeq 5$ is sufficient for the smallest frequencies considered (e.g., when the cross-sectional dimensions w, h are of the order of δ), and as few as $G_{Lag}=10$ are necessary when δ becomes one order of magnitude smaller than the smallest dimension.

2. Terms without Exponential Decay

Figure 3:
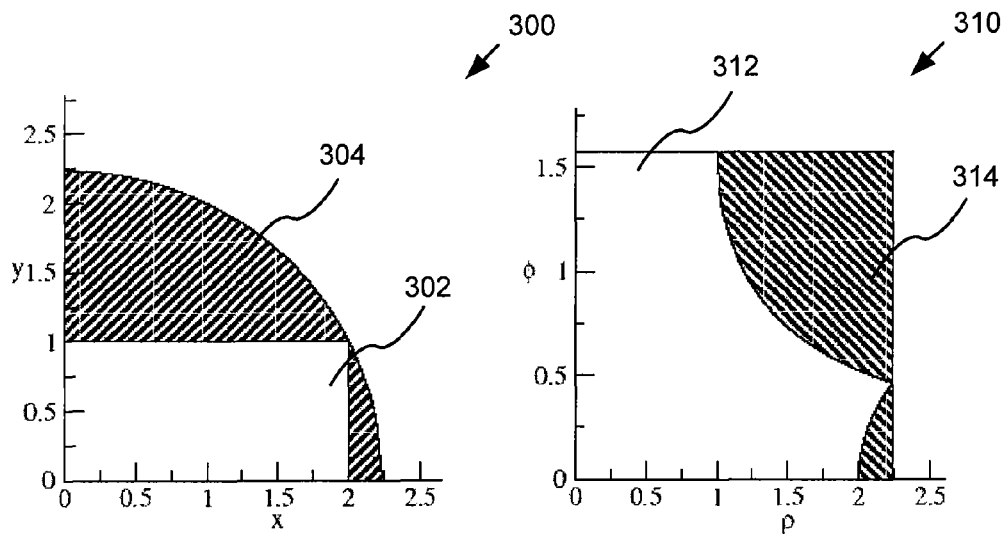
FIG. 3 illustrates an exemplary change of coordinate systems as can be performed during the computation of a same-conductor integral and according to one embodiment of the disclosed technology.

For the [H,V] integrals, the weight functions are:

$$\xi_x = \cos\left(\frac{w-x}{\delta}\right) e^{-\frac{w-x}{\delta}} - \cos\left(\frac{x}{\delta}\right) e^{-\frac{x}{\delta}} - \kappa_x \qquad (23)$$

$$\xi_y = \cos\left(\frac{h-y}{\delta}\right) e^{-\frac{h-y}{\delta}} - \cos\left(\frac{y}{\delta}\right) e^{-\frac{y}{\delta}} - \kappa_y,$$

where $\kappa_x \equiv 1-\exp(\alpha_i^* w)$, $\kappa_y \equiv 1-\exp(\beta_j h)$. The product between the last term of each these functions is an L-L term (in fact, it is flat), and thus Gauss-Laguerre quadrature rules are not applicable. Moreover, it is not efficient to use a linear Gaussian quadrature rule for each axis, in view of the singularity in F at ρ=0. In order to circumvent this, a switch to a polar coordinate system as shown in FIG. 3 can be made where:

$$\begin{cases} \rho \equiv \sqrt{x^2 + y^2} \\ \varphi \equiv \arctan(y/x) \end{cases} \Leftrightarrow \begin{cases} x = \rho \cos(\phi) \\ y = \rho \sin(\phi), \end{cases} \qquad (24)$$

with the Jacobian given by ρ. Therefore, the integrand goes to zero near ρ=0, thus removing the integrable singularity at the origin. Graph 300 in FIG. 3 illustrates an example of a conductor's integration domain 302 in Cartesian coordinates and an excess region 304, giving a contribution that is desirably deduced from the total value. Graph 310 in FIG. 310 illustrates the integration domain 312 for the same conductor after being transformed into polar coordinates. A cost of making this change of variables is the irregular shape of this new integration domain 312. The shaded region 314 in graph 310 again illustrates the excess region whose contribution is to be deduced from the total value.

To deal with this domain, one can first integrate over the square $\rho \in [0, \sqrt{w^2+h^2}]$, $\phi \in [0, \pi/2]$ domain (the quarter-circle in the original variables). This integral is done analytically, giving a contribution:

$$3t^2 \sinh^{-1}\left(\frac{1}{t}\right) + (t^2 - 2)\sqrt{1+t^2} + 2t^3 + 2, \qquad (25)$$

with $t \equiv L/\rho_c$. The value of the contributions of the excess regions (the shaded sections of FIG. 3) can be estimated by approximating the limiting functions $\phi_{max}=\sin^{-1}(h/\rho)$ for $\rho \in [h, \rho_c]$ and $\phi_{min}=\cos^{-1}(w/\rho)$ for $\rho \in [w, \rho_c]$ with Taylor expansions, since the singularities are no longer a concern.

With these combined techniques, self-conductor integrals can be carried out with no more than 200 calls to the integrands.

B. Different Conductor Integration Domains

Reductions similar to the ones illustrated in (18) for the same-conductor case can also be obtained using the same characteristic exponential/linear classifications of Table 1.

Compared to the same-conductor case, and in certain embodiments of the disclosed technology, these decompositions split up the integration domain into a more complicated set of sub-domains (see, e.g., FIG. 1). For example, the x-integral on the interval [$x_0-w'$, $x_0+w$] can be divided into four terms: two terms, ranging [$x_0-w'$, $x_0+w-w'$] and [$x_0$, $x_0+w$] of length w whose behavior (exponential or linear) is given by $\alpha_j$; plus two other terms, [$x_0-w'$, $x_0$] and [$x_0+w-w'$, $x_0+w$] of length w' whose behavior is given by $\alpha_i^*$. The cost of this reduction is that, for each type of term, there are four different values of ρ to consider.

Furthermore, none of the symmetries mentioned above for the same-conductor integrals hold for the different-conductor counterparts, except for some limited situations (for example, when both conductors belong to the same metal layer, then $y_0=0$ and h=h', thus simplifying the integration domains for the y-integration as if it were same-conductor).

However, one advantage of integrals for different conductors that can be realized in certain embodiments is that, since the singularity is not included in the integration domain, they can be accurately computed with simple approximations. In practice, for each term and according to one exemplary embodiment, the following strategies can be applied:

1. Exponential Contributions

In one exemplary embodiment, exponential contributions are integrated by carrying out a Taylor expansion of everything but the exponential term. Then the integral is approximated as a product of an exponential term and a polynomial:

$$\int_0^w e^{\alpha_j x} F(\hat{\rho}(x,y)) dx \simeq \sum_{n=0}^R \frac{J_n}{n!} \frac{\partial^n}{\partial x^n} F(\hat{\rho}(x,y)) \bigg|_{(x=0)}, \quad (26)$$

where the numbers $J_n$ are computed analytically using the recursion, $$J_n \equiv \int_0^w x^n e^{\alpha_j x} dx = \frac{1}{\alpha_j}(w^n e^{\alpha_j w} - nJ_{n-1} - \delta_{n0}).$$

Is has been observed that order-2 Taylor polynomials suffice for the analyzed examples, albeit the additional cost associated with increasing the order is negligible if needed. This is due to the fact that the derivatives of function F are products of even polynomials in ρ times the functions already included in F.

2. Linear/Flat Contributions

Weight functions $\xi_x$ corresponding to integrals of type [H,V] or [C,V] contain a flat term over an interval of length w', Expression (23); those for [V,V] are trapezoidal, composed of two linear intervals of length $w_<$ plus one flat one of length $w_>$, where $w_{>(<)}$ is the greater (smaller) of w,w', Expression (14).

Linear intervals are integrated with a q-point Gauss-Jacobi quadrature rule, as in Section III.A.1, whereas flat intervals are integrated with a q-point Gauss-Legendre quadrature rule. It has been found that the required number q is generally very small (e.g., q=3).

Using these two methods, combining the x-and y-contributions, the contributions for each type of integral in Table 1 can be composed. The number of calls to transcendental functions is $N_{calls}$, $$N_{calls} = 4(qN_L + q^2 N_{LL} + N_{EE}) = \begin{cases} 4 + 8q + 4q^2 & [H, V] \\ 16q & [H, H] \\ 4 + 8q & [H, C] \\ 16 & [C, C], \end{cases} \quad (27)$$

where $N_E$ is the number of terms with a single linear (LE, EL) contribution, $N_{LL}$ is the number of LL terms, and $N_{EE}$ is the number of EE terms. (Taylor contributions cost only one call, since the exponentials for each mode j can be evaluated once per mode at setup time, stored and reused for every matrix element $L_{ji}$).

C. Representative Example

Figure 5:
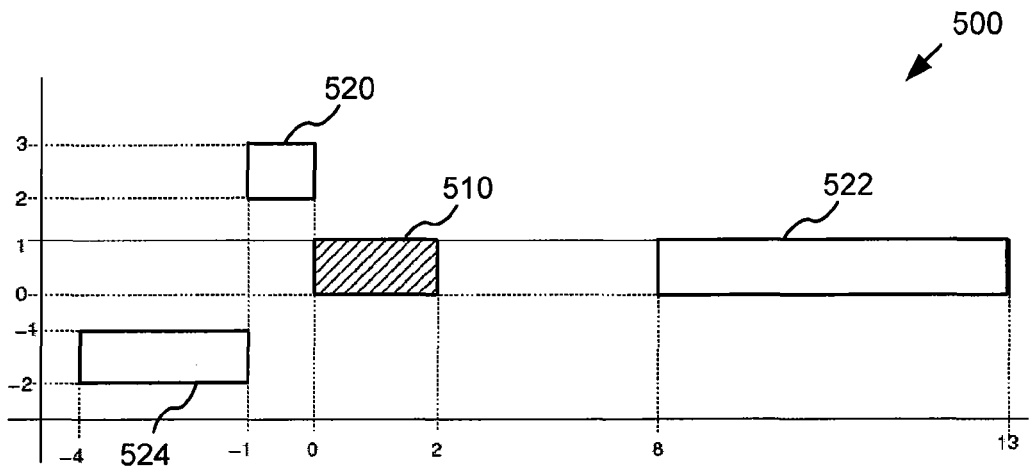
FIG. 5 is a schematic block diagram illustrating the wire configuration used in obtaining the results shown in FIG. 4. All numbers in FIG. 5 express dimensions in microns.

Consider the wiring configuration 500 shown in FIG. 5, wherein the loop impedance for the configuration 500 is computed and wherein wire 510 of the configuration is the signal wire and the other wires 520, 522, 524 form the return paths. As a reference for accuracy, Fast-Henry was used with each wire decomposed into 81 filaments.

Figure 4:
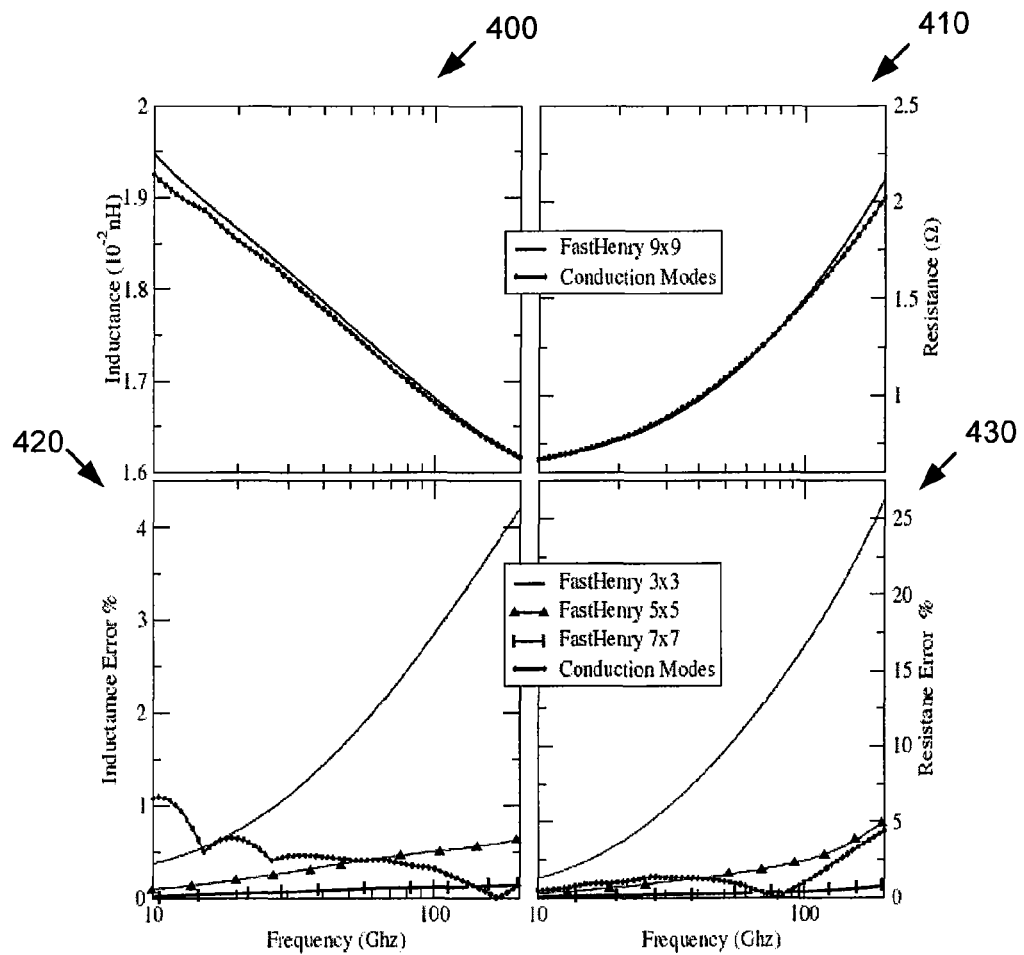
FIG. 4 is a collection of graphs comparing results from embodiments of the disclosed technology to results from a conventional inductance extraction tool.

In graphs 400, 410 of FIG. 4, inductance and resistance are shown as function of frequency, for the exemplary conduction mode technique described above with four side modes and for FastHenry with 81 modes. The total size of the linear system contains 2592 unknowns in FastHenry versus 16 complex numbers (size of 32) for the exemplary conduction mode technique. In graphs 420, 430 of FIG. 5, the percent error using the exemplary conduction mode technique with four conduction modes is displayed. Similar comparisons are plotted when using FastHenry with increasing precision levels.

TABLE 2

Sizes and Runtimes for different methods

| Method | Size | Runtime (ms) |
|---|---|---|
| FH 9x9 | 2592 | 5333.3 |
| FH 7x7 | 1568 | 833.3 |
| FH 5x5 | 800 | 186.4 |
| FH3x3 | 288 | 24.7 |
| CM exact | 32 | 1742.4 |
| CM approx. diff | 32 | 117.0 |
| CM approx. all | 32 | 10.7 |

Run times for the above example, together with FastHenry, are displayed in Table 2. In particular, in Table 2, "CM approx. diff." refers to the savings obtained using just the exemplary different-conductor approximations (Section III.B); "CM approx. all" refers to the complete approximations in Sections III.A and III.B; and "CM exact" is using the algorithm in J. Berntsen et al., "An adaptive algorithm for the approximate calculation of multiple integrals," *ACM Transactions on Mathematical Software*, vol. 17, pp. 437-451, 1991 for all integrals.

Each of the different methods was computed on an Opteron 2.4 Ghz processor, averaging over identical sweeps of 100 frequencies for each method. The runtimes show less than 0.5% dispersion. This example is representative of the capabilities of the exemplary approach.

Concerning the source of improvements in runtimes with respect to the numerical integration "CM exact", they have two distinct components in this example: there is an initial order of magnitude savings in approximating the integrals for different conductors (Section III.B); this reduced runtime is now dominated by the same-conductor integrals, and one further order of magnitude is gained while applying the approximations for same-conductor integrals (Section III.A). In general, the results from using the exemplary conduction-mode technique are very accurate with very few terms.

IV. Exemplary Methods for Applying the Disclosed Technology

In this section, exemplary methods for applying embodiments of the disclosed technology are disclosed. The disclosed methods are not to be construed as limiting, however, as aspects of the disclosed technology can be applied to an impedance extraction flow in a variety of manners.

Figure 6:
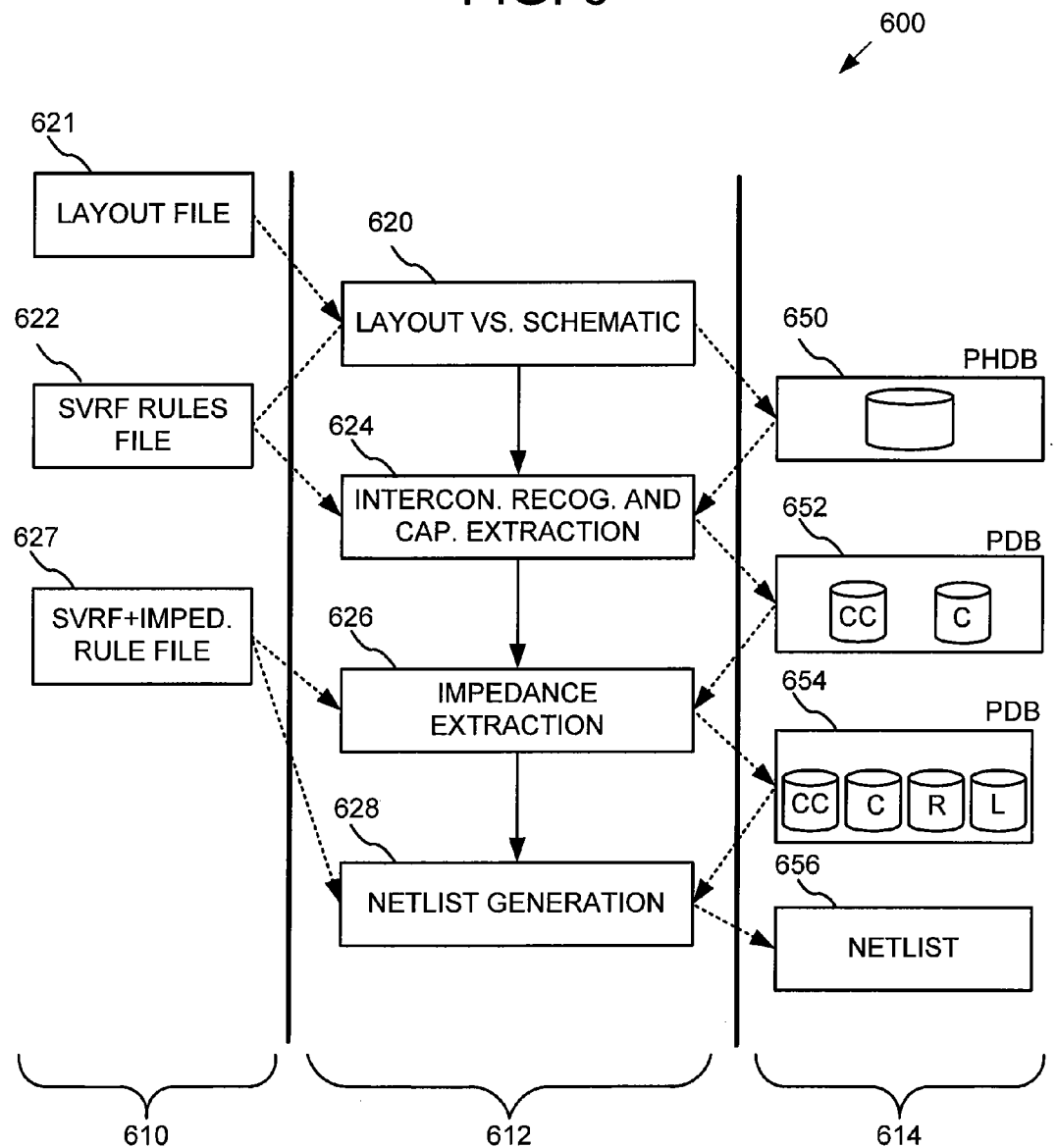
FIG. 6 is a schematic block diagram illustrating an overall impedance extraction method according to an exemplary embodiment of the disclosed technology.

FIG. 6 is a block diagram 600 showing a high-level block diagram illustrating an exemplary embodiment of an overall extraction flow in which embodiments of the disclosed technology can be used. In particular, the block diagram 600 illustrates the files used during one exemplary technique in region 610, the general procedures performed in region 612 (which may be performed, for example, by separate software components or by the same software component), and the files and data structures generated during the implementation of the exemplary technique in region 614.

At 620, a layout file 621 is received and loaded (e.g., a GDSII or an Oasis file) and a layout-versus-schematic procedure performed. The layout-versus-schematic procedure discriminates devices from conductors in the circuit layout (e.g., interconnects). Information about the conductors can be stored in a database, such as a persistent hierarchical database (PHDB) 650. One or more SVRF rules files 622 can also be used during this procedure.

At 624, an interconnection recognition and capacitance extraction procedure is performed. For example, the PHDB can be processed in order to extract geometrical information about the conductors (e.g., interconnect wires). According to one exemplary embodiment, and as noted above, shapes in the PHDB belonging to wire paths or nets are broken (or fractured) in such a way as to have straight segments of wire with their entire volume in the same layer and with constant width. In the illustrated embodiment, the database "Parasitic Database" (PDB) 652 is generated. In the illustrated embodiment, capacitance extraction is also performed, resulting in capacitance values C for the capacitance to ground for each wire segment and values CC for the coupling capacitance among signal-wire segments being stored in the PDB 652.

At 626, impedance extraction is performed. Impedance extraction can be performed using any of the exemplary techniques described herein. In the illustrated embodiment, an SVRF and impedance rule file 627 is used in connection with the impedance extraction. The file 627 can contain, for example, information about the electrical parameters in the circuit layout. For instance, information about a desired frequency of operation of the circuit layout, conductivities of the conductors ($\sigma$), electrical permitivities ($\epsilon$), and/or magnetic permeabilities ($\mu$) can be stored and retrieved from the file 627. As illustrated in the PDB 654 (updated from the PDB 652), impedance extraction generates resistance R and inductance L values.

At 628, a netlist generation procedure is performed to create a representation of the electrical characteristics of the layout using the R, L, C, CC values stored in the PDB 654. In certain desirable embodiments, model order reduction techniques are applied to the netlist. A netlist 656 representative of the electrical characteristics (e.g., a Spice netlist) is generated and stored. The netlist 656 can subsequently be used to perform, for example, timing simulation to help verify the physical design of the circuit.

The above-described flow should not be construed as limiting in any, however, as in other exemplary embodiments, any subset of these method acts is performed. In still other embodiments, any one or more of the method acts are performed individually or in various other combinations and subcombinations with one another.

Figure 7:
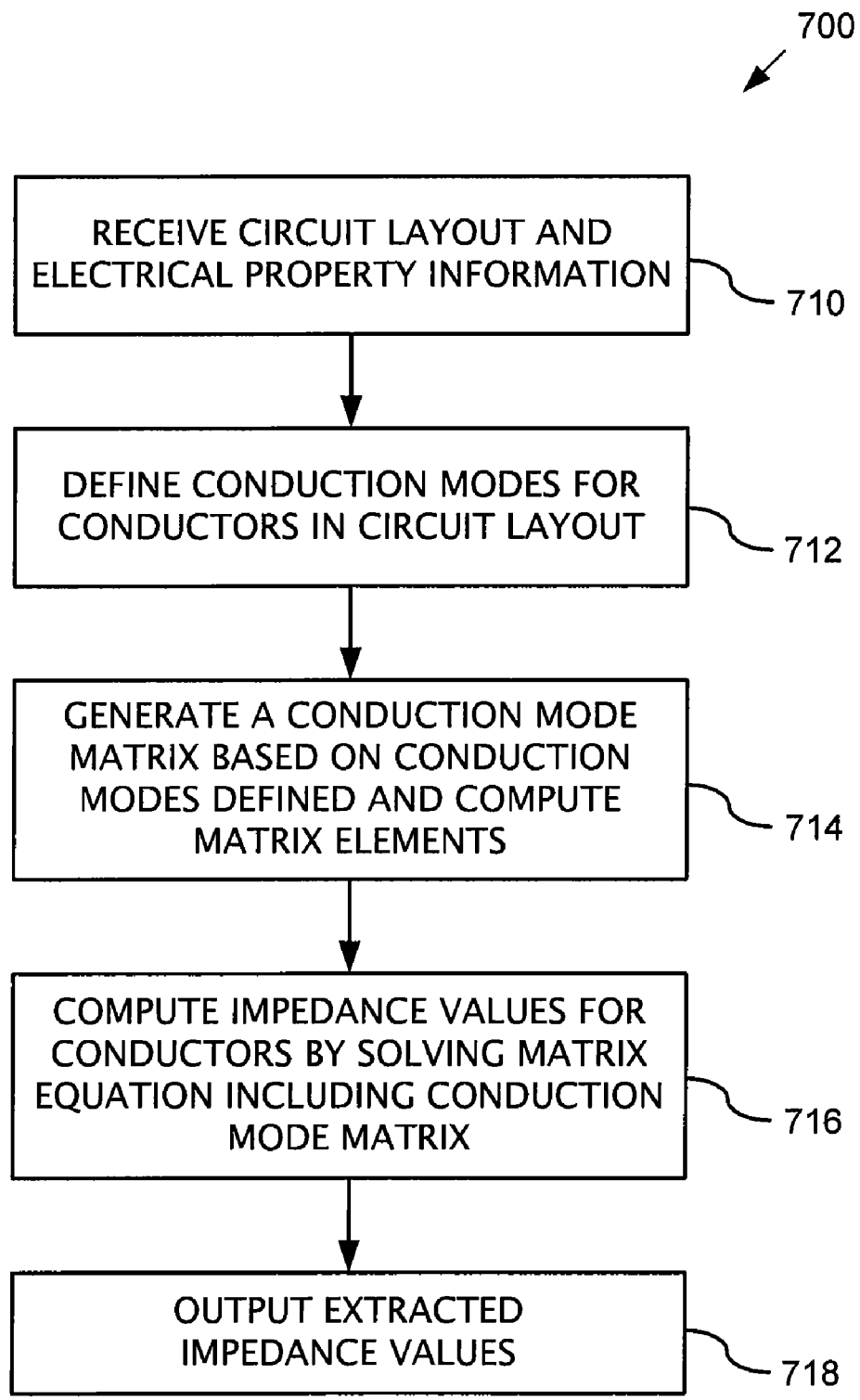
FIG. 7 is a flowchart illustrating an exemplary method for extracting impedance values using any of the disclosed conduction mode matrix element computation techniques.

FIG. 7 is a flowchart 700 showing an overall technique for performing impedance extraction using any of the conduction mode techniques described in Section III. The particular embodiment shown in FIG. 7 should not be construed as limiting in any way, as any of the illustrated method acts that are shown in FIG. 7 can be performed alone or in various other combinations and subcombinations. Exemplary implementations for performing some of the method acts shown in FIG. 7 are more specifically illustrated in FIGS. 8 and 9 and discussed below.

At 710, information about a circuit layout (or a portion of a circuit layout) and about the electrical properties of the circuit layout are received (e.g., loaded or buffered). For example, the information can describe the geometries of the conductors in the circuit layout (including widths, lengths, thicknesses, and relative positions). For instance, this information may be obtained after the fracturing of method act 624 above. The information can also include information about a desired frequency of operation of the circuit layout, the conductivities of the conductors ($\sigma$), the electrical permitivities of the conductors ($\epsilon$), and/or the magnetic permeabilities of the conductors ($\mu$). This information can be received from a single file or from separate files.

At 712, conduction modes for the conductors in the circuit layout are defined. For example, the number of conduction modes can be determined from the circuit layout information obtained and according to the expressions introduced above in Section II. In particular embodiments, the number of conduction modes calculated for a given conductor can be set by a user or predetermined (e.g., four side modes per conductor, four corner modes per conductor, or four side modes and four corner modes per conductor). Furthermore, and as more fully explained below, additional conduction modes may be created in certain embodiments in order to account for precision losses that may result when a conductor pair includes one relatively wide wire in comparison to the other conductor of the pair, or when the overlapping dimension is small compared the width. The determination and definition o these additional one or more conduction modes can be performed as part of method act 712 (e.g., based on the relative width and overlap between certain conductor pairs).

Figure 8:
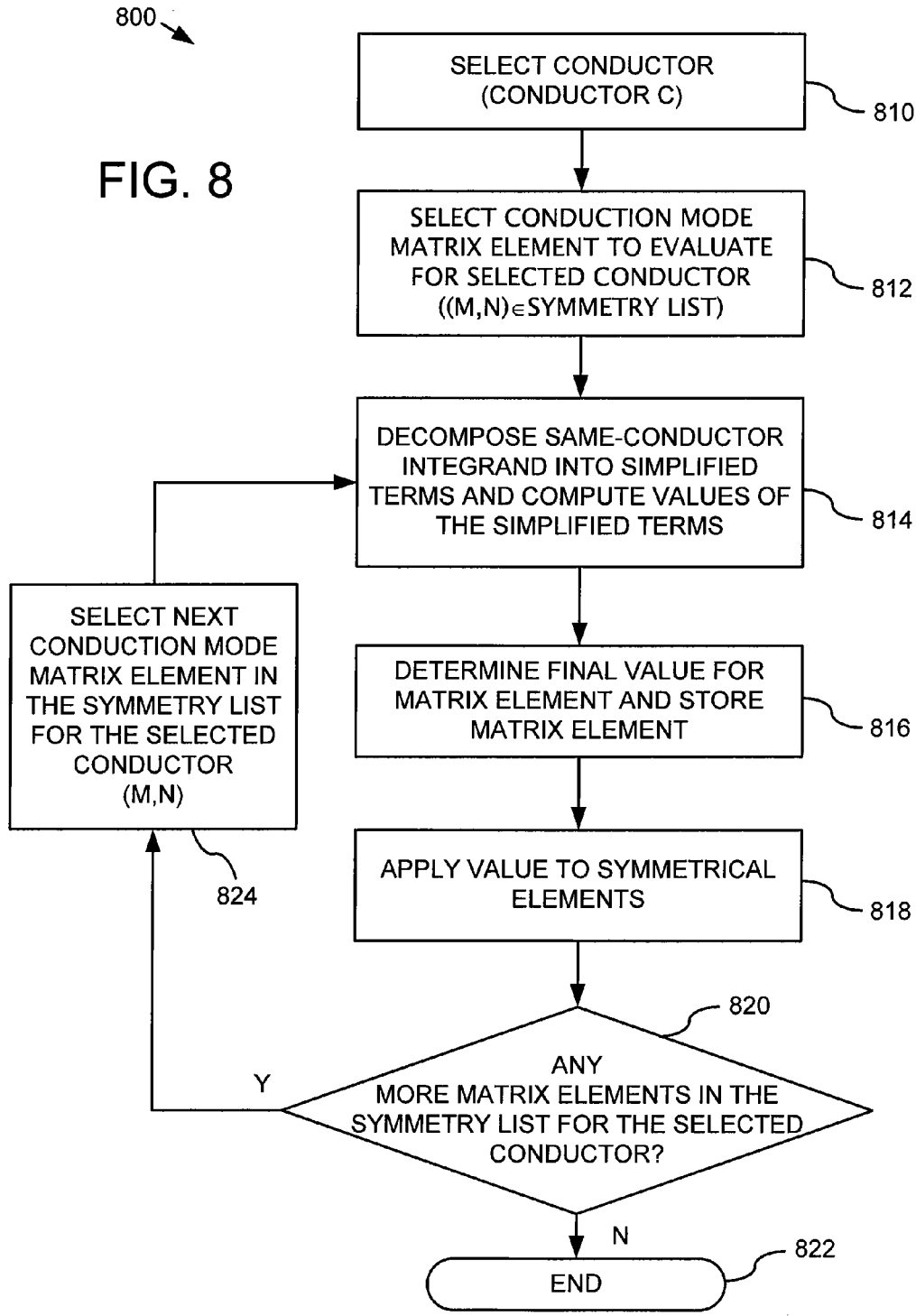
FIG. 8 is flowchart illustrating an exemplary method for computing matrix elements corresponding to same-conductor integrands according to the disclosed technology.
Figure 9:
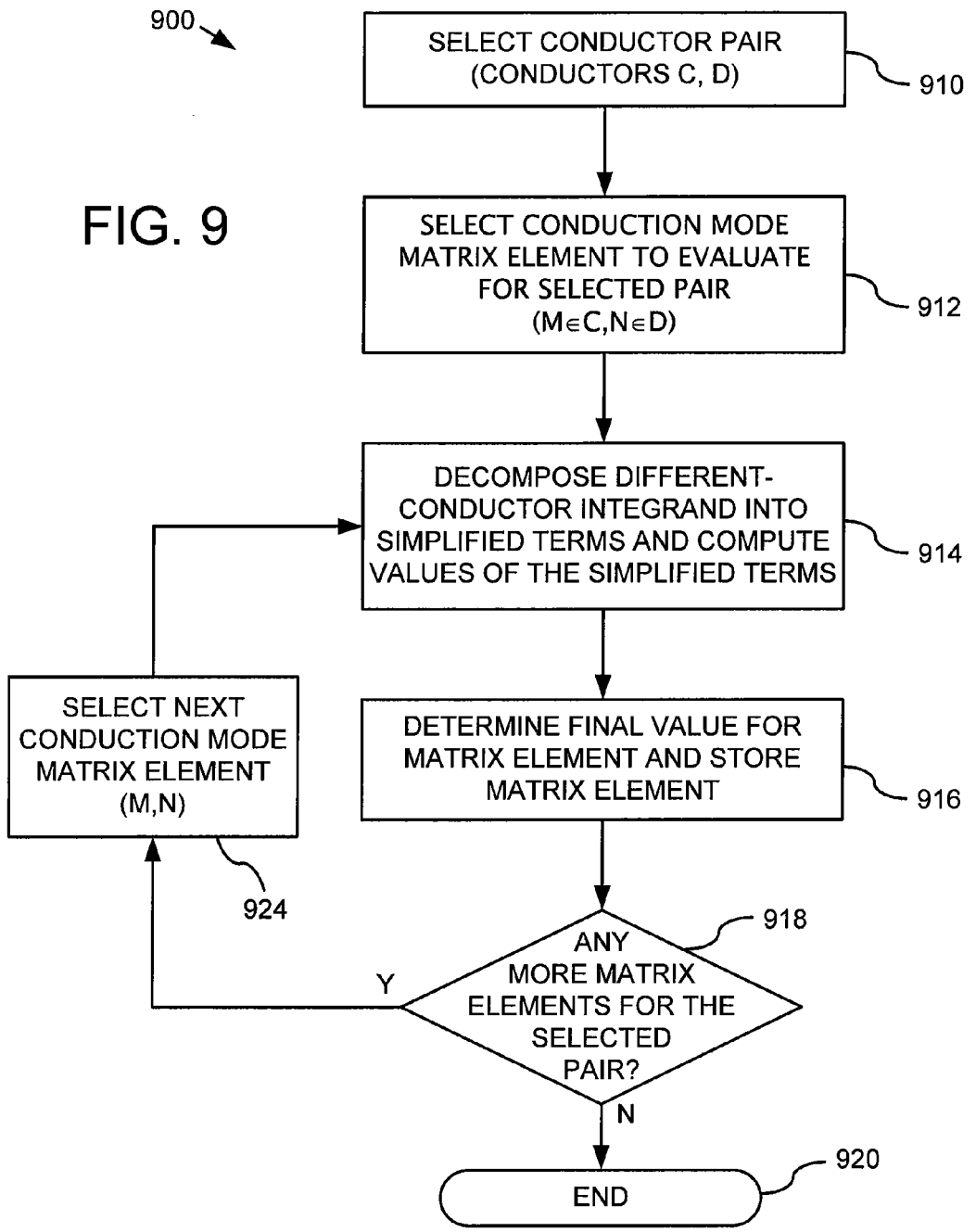
FIG. 9 is flowchart illustrating an exemplary method for computing matrix elements corresponding to different-conductor integrands according to the disclosed technology.

At 714, a conduction mode matrix is generated based on the conduction modes and the values of the conductive mode matrix elements are computed. For example, in one embodiment, n conduction modes are defined at method act 712, resulting in a conduction mode matrix of size $n^2$ (e.g., an m×n matrix where dimensions m and n have a common size n and in which individual matrix elements can be denoted as M, N). The matrix elements can be computed using any one or more of the procedures described above in Section III or Section V.B below. For example, the matrix elements can be computed using simplified terms that are more computationally efficient than computing the corresponding conduction mode integrands. Furthermore, matrix elements corresponding to same-conductor integrands can be treated differently than matrix elements corresponding to different-conductor integrands. An exemplary method for computing matrix elements corresponding to same-conductor integrands is illustrated in FIG. 8 discussed below, and an exemplary method for computing matrix elements corresponding to different-conductor integrands is illustrated in FIG. 9 discussed below. The terms corresponding to same-conductor integrands can be computed first, followed by the terms corresponding to different-conductor integrands, or vice versa. In other embodiments, the computations for same-conductor integrands are performed at least partially simultaneously with one or more different-conductor integrands.

At 716, impedance values for the conductors in the circuit layout are computed by solving a matrix equation that includes the conduction mode matrix. For example, Expression (4) can be solved. To solve this linear system, additional information for the right-hand side of the equation is typically needed. For instance, additional information about the interconnections between the conductors and the locations of the ports is typically used. In one particular embodiment, the matrix equation is solved using a solver that performs an LU decomposition. See, e.g., W. H. Press et al., "Numerical Recipes: The Art of Scientific Computing," 1st ed., Cambridge University Press, 1986. In particular embodiments, an admittance matrix Y (e.g., an n×n array with n the number of conductors) representing the electromagnetic interaction between conductors is obtained. The elements $Y_{ik}$ of the admittance matrix are defined as the current on conductor i when conductor k is subject to a unitary voltage drop and all others are grounded at both ends:

$$Y_{ik} = \sum_{p \in cond_i} I_p^{(k)}; \quad I^{(k)} = C^{-1} B^{(k)}; \quad B_i^{(k)} = \begin{cases} 1 & \text{if } i \in cond_k \\ 0 & \text{else,} \end{cases} \quad (28)$$

where C is the conduction mode matrix (given by [R+j$\omega$L] in Expression (4). From the admittance matrix, relevant magnitudes (e.g., impedance, S-parameters, and so on) can be computed through elementary circuit theory. For example, in the MQS domain, the currents at both ends of a conductor are identical. In this case, the impedance matrix can be found as follows:

$$Z=Y^{-1}. \tag{29}$$

FIG. 8 is a flowchart 800 showing an exemplary technique for computing matrix elements in which the conduction modes are in the same conductor. The particular embodiment shown in FIG. 8 should not be construed as limiting in any way, as any of the illustrated method acts that are shown in FIG. 8 can be performed alone or in various other combinations and subcombinations.

At 810, a conductor is selected. For example, the conductors in the circuit layout can be ordered sequentially and can be selected sequentially for consideration. The conductors can also be selected in a reverse sequence, randomly, or according to any other pattern.

At 812, a matrix element corresponding to two conduction modes in the selected conductor is selected. This selection can be denoted as the selection of a pair of conduction modes (M, N) belonging to the same conductor. In particular embodiments, a symmetry list is generated that comprises a subset of the total number of matrix elements corresponding to conduction modes of the same conductor. For example, the symmetry list can be created by taking into account the mode equivalencies that occur for the same-conductor integrals (see, e.g., FIG. 2). The selection of the matrix elements in the symmetry list can be made sequentially, reverse sequentially, randomly, or according to any other pattern or fashion.

At 814, the corresponding same-conductor integrand for the matrix element is computed using simplified terms (e.g., terms that are more computationally efficient than the corresponding integrand). The process of using simplified terms for computing the corresponding same-conductor integrand can be referred to as decomposing the same-conductor integrand into simplified terms. In particular implementations, and as described in detail in sections III.A and/or V.B, the selected matrix element can be classified according to the types of conduction modes in the matrix element and the exponential and linear contributions to the integrand that are to be computed based on the conduction mode type. In particular implementations, and as discussed in section III.A.1, the exponential contributions to the corresponding same-conductor integrand can be computed using terms based on Gaussian-Laguerre quadrature rules (e.g., the "x" integration for [H,H] integral types), and a Gauss-Jacobi rule for linear terms (e.g., the "y" integration for [H,H] integral types). Furthermore, and as discussed in section III.A.2, terms with no exponential contributions on either axis, and corresponding to same-conductor integrand, can be computed using terms derived by changing the integrand into a polar coordinate system and using Taylor expansions (e.g., the LL part of [H,V] integral types). All these terms can be computed alternatively with the interpolation and analytical methods described in Section V.B.1, V.B.2 and V.B.3.

At 816, the final value for the matrix element is determined from the simplified terms and its value stored (e.g., as conduction mode matrix element ($C_{M,N}$))

At 818, the value computed for the conduction mode matrix element is applied or assigned to one or more other matrix elements based on conduction mode symmetries. For example, the symmetries described in section III.A and/or shown in FIG. 2 can be used to guide how the value of the computed matrix element is assigned to other matrix elements.

At 820, a determination is made as to whether there exist any more conduction mode matrix elements corresponding to two conduction modes for the selected conductor. For example, a determination can be made as to whether any more matrix elements in the symmetry list are to be computed. If so, the next conduction mode matrix element for the selected conductor is selected at 824 (e.g., sequentially, reverse sequentially, randomly, or according to any other pattern or fashion). Otherwise, the exemplary technique terminates at 822.

FIG. 9 is a flowchart 900 showing an exemplary technique for computing matrix elements in which the conduction modes are in different conductors. The particular embodiment shown in FIG. 9 should not be construed as limiting in any way, as any of the illustrated method acts that are shown in FIG. 9 can be performed alone or in various other combinations and subcombinations.

At 910, a conductor pair is selected. For example, the conductors in the circuit layout can be ordered sequentially and one conductor can be selected sequentially for consideration with another conductor, also selected sequentially from the remaining conductors. The conductors can also be selected in a reverse sequence, randomly, or according to any other pattern or fashion.

At 912, a matrix element corresponding to two conduction modes between the selected conductor pair is selected. For instance, a matrix element corresponding to a first conduction mode in the first conductor and a second conduction mode from the second conductor can be selected. The selection of the matrix elements for the selected conductor pair can be made sequentially, reverse sequentially, randomly, or according to any other pattern or fashion.

At 914, the corresponding different-conductor integrand for the matrix element is computed using simplified terms (e.g., terms that are more computationally efficient than the corresponding integrand). The process of using simplified terms for computing the corresponding same-conductor integrand can be referred to as decomposing the same-conductor integrand into simplified terms. In particular implementations, and as described in detail in section III.B, the selected matrix element can be classified according to the types of conduction modes in the matrix element and the exponential and linear contributions to the integrand that are to be computed based on the conduction mode type. In particular implementations, and as discussed in section III.B.1, the exponential contributions to the corresponding different-conductor integrand can be computed using Taylor expansions and the product of an exponential term and a polynomial. Furthermore, and as discussed in section III.B.2, the linear contributions to the corresponding different-conductor integrand can be computed using terms based on Gaussian quadratures. All these terms can be computed alternatively with the interpolation and analytical methods described in Section V.B.1, V.B.2 and V.B.3.

At 916, the final value for the matrix element is determined from the simplified terms and its value stored (e.g., as a conduction mode matrix element ($C_{M,N}$))

At 918, a determination is made as to whether there exist any more conduction mode matrix elements corresponding to two conduction modes for the selected conductor pair. If so, the next conduction mode matrix element for the selected conductor pair is selected at 924 (e.g., sequentially, reverse sequentially, randomly, or according to any other pattern or fashion). Otherwise, the exemplary technique terminates at 920.

V. Special Considerations for Conductor Pairs with One Substantially Wider Conductor

A. Defining Localized Conduction Modes for Wide Wires

In certain embodiments of the disclosed technology (e.g., embodiments in which four side modes per wire are computed), there can be a loss of accuracy for configurations in which one wire is on top of a significantly wider one (e.g., a ground plane). This loss of accuracy is due to the fact that conduction modes are typically defined for the whole wire, and therefore can only account for current crowding at the borders of wires, and not in the characteristic "shadow" of the narrow wires on the wide ones. To overcome this drawback, and in certain particular implementations of the disclosed technology, localized conduction modes can be defined for each of these configurations.

In general, there are four possible scenarios for this situation according to the comparisons of widths and positions of the wires. In FIG. 10, the decomposition of the wire labeled "1" is analyzed, for the four possible types of overlap.

In particular embodiments, two parameters are defined in order to define the localized conduction modes: $x_{ovlp}$, the starting point of the overlapping region, and $w_{ovlp}$, the width of the overlapping region. In one implementation, the following conduction modes can be defined for a wide wire: two local vertical modes at the overlapping region; two vertical local modes at each region adjacent to the overlapping one, of width equal to the double of the overlap; and two vertical plus one horizontal mode for the rest of the wire.

The decomposition into additional conduction modes can be performed after a criteria is applied to a pair of wires to determine whether one of the wires is to be considered to be a "wide" wire. In one particular implementation, whether a wire is to be considered "wide" depends on the comparison between the width of the wire being analyzed ($w_1$ in FIG. 10) and $w_{ovlp}$. This comparison can be governed by a parameter (e.g., MIN_OVERLAP) corresponding to the maximum value of the fraction $w_{ovlp}/w_1$ that requires decomposition of wire 1. That is, if the fraction $w_{ovlp}/w_1$ is greater than MIN_OVERLAP, then the additional decomposition is not performed. The value of MIN_OVERLAP can be set by the user or predetermined. In one exemplary implementation, the value is set to ⅓ but can be adjusted by the user.

Conduction modes from different subregions of a wide wire are desirably treated as belonging to different conductors. Therefore, in these type of configurations, "effective conductors" are defined, while keeping the information about the original wire from which the subregion comes from (which is necessary for computing the solution).

The scheme presented above is applied to two-wire configurations. In the general multiple-wire case, it is desirable to evaluate each pair of wires. In carrying out this evaluation, there is the risk of defining very small conductors (for example, the new effective conductor that is defined can be very small). Defining such small conductors is desirably avoided to prevent recursive definitions of effective conductors in the presence of more wires. For this reason, a minimum width of the subregions can also be established. For example, in one particular implementation, the minimum width of a subregion is a fraction of $w_{ovlp}$ and can be controlled by a separate parameter (e.g., MIN_SUBCONDUCTOR). The MIN_SUBCONDUCTOR parameter can be set by the user or predetermined. In one exemplary implementation, the parameter is preset to ½ but can be adjusted by the user. The minimum width for a subregion can also be bounded by a comparison to a fraction of skin depth $\delta$.

Furthermore, in particular implementations, each of the effective conductors can be characterized as being one of multiple possible conductor types. Table 3 below shows the possible types and number and type of conduction modes associated with each type according to one exemplary embodiment.

TABLE 3

Characterizations of Conductors and Effective Conductors

| Type | No. of modes | Modes | Description |
| --- | --- | --- | --- |
| 0 | 4 | N, S, E, W | No decomposition done |
| 1 | 3 | N, S, W | Left-most effective conductor |
| 2 | 2 | N, S | Middle effective conductor |
| 3 | 3 | N, S, E | Right-most effective conductor |

B. Terms for Computing Matrix Elements for the Effective Conductors

The simplified terms introduced in Section III are valid for computing integrals where the distance between conductors is never zero. However, this is not the case for the integrals involving modes from bordering effective conductors, as described in the previous subsection.

According to one implementation, only side modes are treated, so that either $\alpha$ or $\beta$ vanish for every mode. If $\alpha=0$, the mode is called "vertical" (V), and if $\beta=0$, it is called "horizontal" (H). In this implementation, there are basically two types of integrals, according to the nature of the two intervening modes:

For a [H,H] or [V,V] integral, there is an exponential behavior on one axis, and a linear on the other; these type of contributions are denoted E-L or L-E;

For a [H,V] or [V,H] integral, there are terms of all types: exponential-exponential (E-E), exponential-linear (E-L), linear-exponential (L-E), and linear-linear (L-L).

This classification is related to the way each of these terms is computed. In one embodiment, for modes from bordering effective conductors, the following simplified terms, which are described in greater detail in the following subsections, are used:

L-E and E-L terms are computed by representing the L contribution as a polynomial for the E variable;

E-E terms are handled with a double-interpolation scheme; and

L-L terms are integrated analytically.

1. Exponential-Linear integrals

E-L terms represent integrands that contain an exponential function along the x axis and a linear function on the y-axis, as well as the function $F(\rho)$ that mixes x and y in the combination $\rho(x,y) = \sqrt{x^2+y^2}$:

$$A = \int_{-w'}^{+w} \int_{-h'}^{+h} \xi_x(x)\xi_y(y) F(\rho(x+x_0, y+y_0))\,dx\,dy, \quad (30)$$

where, $$F(\rho) = l\left(\sinh^{-1}\left(\frac{l}{\rho}\right) - \sqrt{1+\frac{\rho^2}{l^2}} + \frac{\rho}{l}\right) \quad (31)$$

$$\xi_x(x) = (\alpha_i^* + \alpha_j)^{-1}(\gamma_1 e^{\alpha_i^* x} + \gamma_2 e^{-\alpha_j x})$$

$$\xi_y(y) = \frac{1}{2}(h + h' - |y| - |y - y_1|),$$

with l the common length to both conductors, $x_1 = w - w'$, and the piecewise-constant functions, where the Heaviside step is used, $$\Theta(x) = \begin{cases} 1 & \text{if } x \geq 0 \\ 0 & \text{if } x < 0, \end{cases}$$

$$\gamma_1 \equiv e^{(\alpha_i^* + \alpha_j)w'} \Theta(x_1 - x) - \Theta(x)$$

$$\gamma_1 \equiv e^{(\alpha_i^* + \alpha_j)w} \Theta(x - x_1) - \Theta(-x). \tag{32}$$

For any fixed value of x, the integral in y can be performed analytically, $$G(x) \equiv \int_{-h'}^{+h} \xi_y(y) F(\rho(x + x_0, y + y_0)) \, dy. \tag{33}$$

The resulting expression (the product $G(x)\xi_x(x)$), however, is not analytically integrable in x. In order to circumvent this, the strategy is to approximate the function $G(x)$ as a polynomial of degree $n_g$, denoted $P_g(x)$. The approximation method is a standard $(n_g+1)$-point interpolation, $$P_g(x) = \sum_{k=0}^{n_g} p_k x^k, \tag{34}$$

s.t. $P_g(x_{g;i}) = G(x_{g;i}) \; \forall \; i = 0, 1, \ldots, n_g,$ where the set of points $x_{g;i} \in [x_{min}, x_{max}]$ can be chosen arbitrarily in order to enhance the level of precision in certain sub-intervals.

In this manner, the integral can be approximated as the product of a polynomial $P_g(x)$ and the exponentials in the weight function $\xi_x(x)$, which can be done analytically using a recursion, namely:

$$J_n \equiv \int_{-w'}^{w} x^n (\gamma_1(x) e^{\alpha_i^* x} + \gamma_2(x) e^{-\alpha_j x}) \, dx \tag{35}$$
$$= C_n + C'_n,$$

where $$C_n \equiv \int_{-w'}^{w} x^n \gamma_1 e^{\alpha_i^* x} \, dx = \frac{1}{\alpha}(K_n - nC_{n-1}) \tag{36}$$

$$C'_n \equiv \int_{-w'}^{w} x^n \gamma_2 e^{-\alpha_j x} \, dx = \frac{1}{\alpha'}(K_n - nC'_{n-1})$$

and $$K_n = \delta_{n0} - w^n e^{\alpha_i^* w} + (w - w')^n e^{\alpha_i^* w + \alpha_i^* w}. \tag{37}$$

2. Exponential-Exponential integrals

For E-E terms, the method described above is not immediately applicable, since neither the x-nor the y-integrals in Expression (33) can be performed analytically. This is due to the presence of exponentials in both $\xi_x$ and $\xi_y$. To cope with these integrals, the first of these functions is approximated by polynomials $P_\xi(x)$. Therefore, for each value $y_{g;i}$, $$G(y_{g;i}) = \int_{-w'}^{+w} \xi_x(x) F(\rho(x + x_0, y_{g;i} + y_0)) \, dx \tag{38}$$

$$\simeq \int_{-w'}^{+w} P_\xi(x) F(\rho(x + x_0, y_{g;i} + y_0)) \, dx.$$

Interpolation of functions in terms of polynomials results in high precision as long as the function being interpolated does not undergo significant changes. Consequently, precision can be controlled by breaking up the full x-interval into sub-intervals where $\xi_x$ is monotonous. Therefore, the full function $G(y_{g;i})$ above is composed of a number $n_\xi$ of contributions, $$G(y_{g;i}) \simeq \sum_{j=1}^{n_\xi} \int_{x_{\xi;j-1}}^{x_{\xi;j}} P_\xi^{(j)}(x) F(\rho(x + x_0, y_{g;i} + y_0)) \, dx, \tag{39}$$

such that $P_\xi^{(j)}$ is a local polynomial approximation to $\xi_x$ in interval $[x_{\xi;j-1}, x_{\xi;j}]$. The extremes $x_{\xi;j}$ of these sub-intervals are readily determined, since $\xi_x$ is composed of complex exponentials $e^{\alpha y}$ with $\alpha = \pm(1+j)/\delta$:

$$x_{\xi;j} = \begin{cases} 0 & \text{if } j = 0 \\ \left(j - \frac{1}{4}\right)\pi\delta & \text{if } j > 0, \text{ for } \Re(\xi_x) \\ \left(j - \frac{3}{4}\right)\pi\delta & \text{if } j > 0, \text{ for } \Im(\xi_x). \end{cases} \tag{40}$$

Because of the exponential decay, the significance of the contribution for each of these intervals decreases with the value of x, and therefore the sum in Expression (39) can be truncated after a few oscillations of the complex exponentials. This observation is especially useful for high frequencies, in which h is generally larger than $\delta$. In particular implementations of the disclosed technology, the number of intervals $n_\xi$ is bounded (e.g., by 6), so that the neglected contributions are smaller than 1 in $10^7$. The integrals in Expression (39) can be performed analytically. Computing $n_g$ such approximations for the $y_{g;i}$, $i = 1, \ldots, n_g$ values, the full integrand can be interpolated using the same technique as in the L-E integral of the previous section (this time, applied to the y-integral).

3. Linear-Linear Integrals

L-L terms appear uniquely in [H,V] integrals, and are "flat-flat" terms of the type, $$A = \int_{x_1}^{x_2} \int_{y_1}^{y_2} F(\rho(x + x_0, y + y_0)) \, dx \, dy. \tag{41}$$

These can be integrated analytically. For same-conductor integrals, $x_1 = 0$, $x_2 = w$, $y_1 = 0$, $y_2 = h$, and the result of the integrals is, $$A = whlS_l + \frac{h}{2}\left(l^2 - \frac{h^2}{3}\right)S_w + \frac{w}{2}\left(l^2 - \frac{w^2}{3}\right)S_h + \tag{42}$$

$$\frac{1}{3}(h^3 U_w + w^3 U_h) - \frac{1}{2}\left(w^2 T_w + h^2 T_h + \frac{1}{3}l^2 T_l\right) - \frac{1}{3}wh(r - \rho),$$

with $$S_w = \sinh^{-1}\left(\frac{w}{\sqrt{l^2 + h^2}}\right);$$

$$S_l = \sinh^{-1}\left(\frac{h}{\sqrt{w^2 + l^2}}\right);$$

$$S_l = \sinh^{-1}\left(\frac{l}{\sqrt{w^2 + h^2}}\right);$$

-continued $$T_w = \tan^{-1}\left(\frac{lh}{wr}\right);$$

$$T_h = \tan^{-1}\left(\frac{wl}{hr}\right);$$

$$T_l = \tan^{-1}\left(\frac{wh}{lr}\right);$$

$$U_w = \sinh^{-1}\left(\frac{w}{|h|}\right)$$

$$U_h = \sinh^{-1}\left(\frac{h}{|w|}\right)$$

$$\rho = \sqrt{w^2 + h^2}\,; r = \sqrt{\rho^2 + l^2}\,.$$

VI. Exemplary Networks for Implementing Embodiments of the Disclosed Technology

Figure 11:
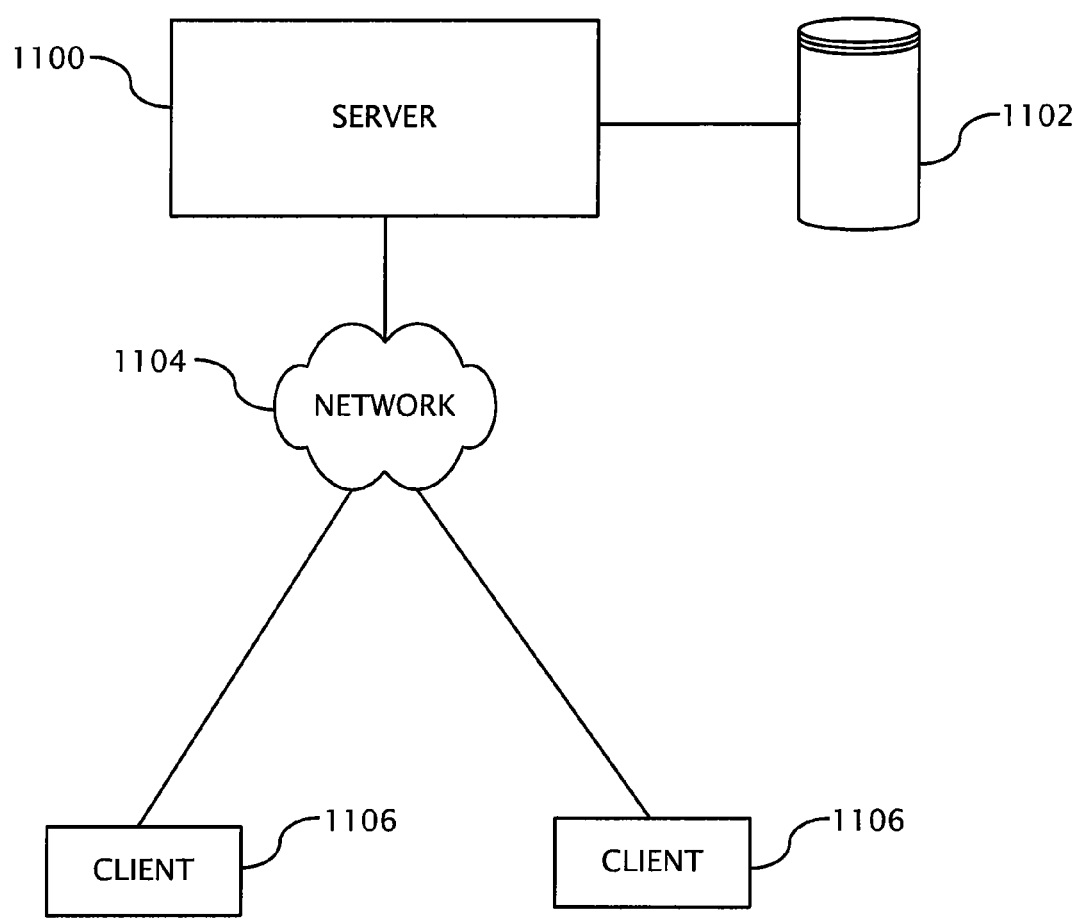
FIG. 11 is a block diagram of a first exemplary network that may be used to perform any of the disclosed impedance extraction techniques.

Any of the aspects of the technology described above may be performed using a distributed computer network. FIG. 11 shows one such exemplary network. A server computer 1100 can have an associated storage device 1102 (internal or external to the server computer). For example, the server computer 1100 can be configured to perform an impedance extraction technique according to any of the disclosed embodiments (e.g., as part of an EDA software tool, such as a physical verification or synthesis tool). The server computer 1100 can be coupled to a network, shown generally at 1104, which can comprise, for example, a wide-area network, a local-area network, a client-server network, the Internet, or other such network. One or more client computers, such as those shown at 1106, 1108, may be coupled to the network 1104 using a network protocol. The work may also be performed on a single, dedicated workstation, which has its own memory and one or more CPUs.

Figure 12:
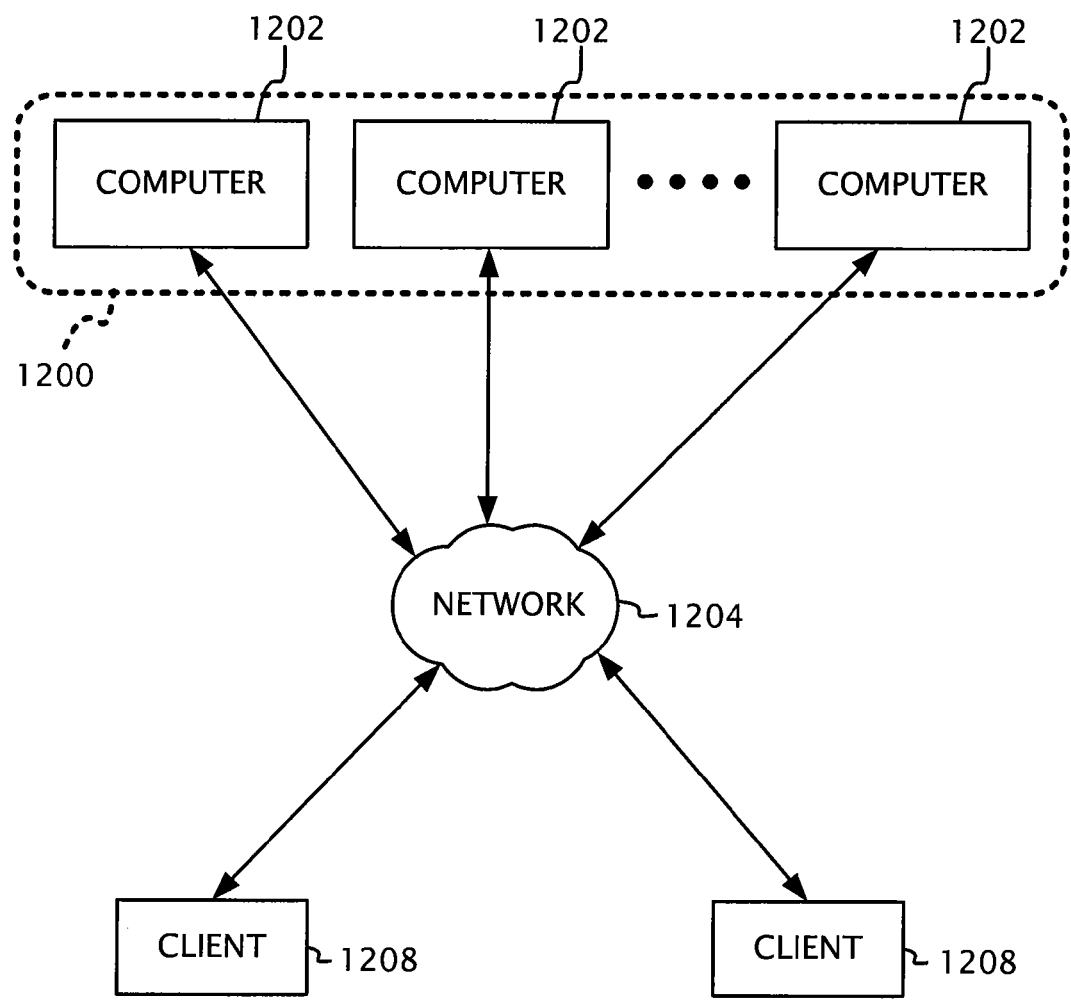
FIG. 12 is a block diagram of a second exemplary network that may be used to perform any of the disclosed impedance extraction techniques.

FIG. 12 shows another exemplary network. One or more computers 1202 communicate via a network 1204 and form a computing environment 1200 (e.g., a distributed computing environment). Each of the computers 1202 in the computing environment 1200 can be used to perform at least a portion of an impedance extraction technique according to any of the disclosed embodiments (e.g., as part of an EDA software tool, such as a physical verification or synthesis tool). For instance, each of the computers may perform impedance extraction for different portions of the circuit design or according to various other criteria. The network 1204 in the illustrated embodiment is also coupled to one or more client computers.

Figure 13:
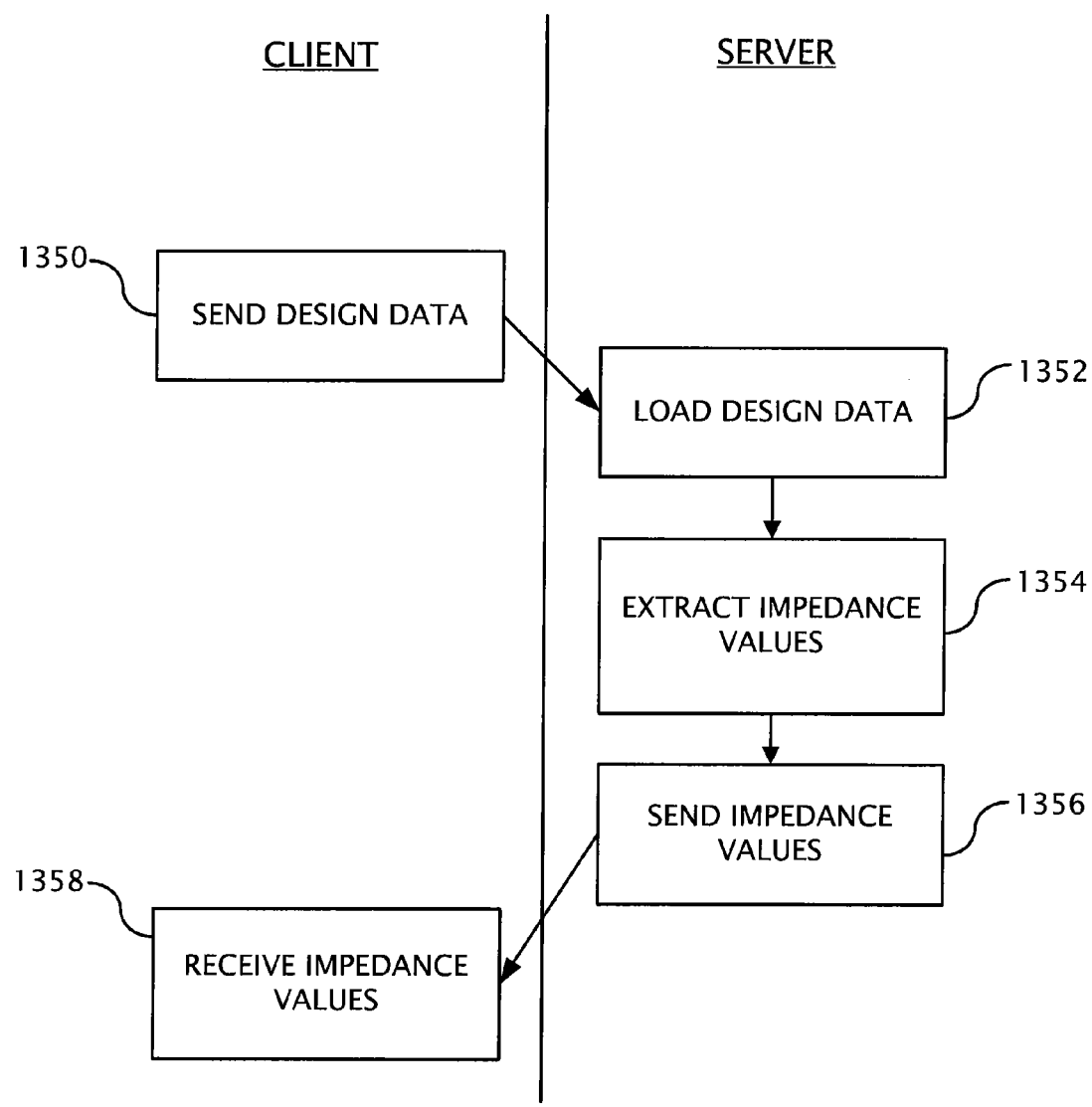
FIG. 13 is a flowchart showing an exemplary manner in which the network of FIG. 11 or FIG. 12 may be used.

FIG. 13 shows that a database or data structure containing design information (e.g., a GDSII, Oasis file, or other such file indicative of a circuit layout) can be analyzed using a remote server computer (such as the server computer 1100 shown in FIG. 11) or a remote computing environment (such as the computing environment 1200 shown in FIG. 12) in order to extract one or more impedance values or values related to impedance extraction (e.g., conduction mode matrix elements values) using any of the embodiments disclosed herein. At process block 1302, for example, the client computer sends design data to the remote server or computing environment. For instance, the client computer may send a GDSII, Oasis file, or other EDA design file along with any other data used in the extraction process. In process block 1304, the data is received and loaded by the remote server or by respective components of the remote computing environment. In process block 1306, impedance or intermediate values are determined using any of the disclosed embodiments. At process block 1308, the remote server or computing environment sends the impedance or intermediate values determined to the client computer, which receives the data at process block 1310. For example, a database or data structure of the relevant impedance values or intermediate values computed by the impedance extraction procedure can be created. The impedance values or intermediate values can be stored, for example, as an updated version of the circuit design data (e.g., included in fields related to each signal wire) or as one or more separate files or data structures (e.g., a Spice file, such as a Spice netlist). It should be apparent to those skilled in the art that the example shown in FIG. 13 is not the only way to obtain extraction results using multiple computers. For instance, the design data may be stored on a computer-readable medium that is not on a network and that is sent separately to the server or computing environment (e.g., a CD-ROM, DVD, or portable hard drive). Or, the server computer or remote computing environment may perform only a portion of the extraction procedures.

Having illustrated and described the principles of the illustrated embodiments, it will be apparent to those skilled in the art that the embodiments can be modified in arrangement and detail without departing from such principles. In view of the many possible embodiments, it will be recognized that the illustrated embodiments are only examples and should not be taken as a limitation on the scope of the disclosed technology. Rather, the scope of the invention is defined by the following claims and their equivalents. We therefore claim as our invention all that comes within the scope and spirit of these claims and their equivalents.

We claim:

1. One or more non-transitory computer-readable storage media storing computer-executable instructions for causing a computer to perform a method, the method comprising:
   loading circuit design information, the circuit design information indicating at least a geometric layout of conductors in a circuit design and a desired frequency of operation for the circuit design;
   defining conduction modes representing distribution functions for currents in the conductors at the desired frequency of operation;
   generating a conduction mode matrix, the conduction mode matrix including matrix elements based on the defined conduction modes, the matrix elements comprising matrix elements corresponding to same conductor integrands and matrix elements corresponding to different conductor integrands;
   computing values for one or more of the matrix elements corresponding to same conductor integrands using a first set of terms;
   computing values for one or more of the matrix elements corresponding to different conductor integrands using a second set of terms, the second set of terms being different than the first set of terms; and
   storing the values for the one or more of the matrix elements corresponding to same conductor integrands and the values for the one or more of the matrix elements corresponding to different conductor integrands.

2. The one or more non-transitory computer-readable storage media of claim 1, wherein the method further comprises computing impedance values for each of the conductors by solving a matrix equation that includes the conduction mode matrix.

3. The one or more non-transitory computer-readable storage media of claim 1, wherein the first set of terms comprises terms that result from decomposing the same conductor integrands into approximations.

4. The one or more non-transitory computer-readable storage media of claim 1, wherein the second set of terms comprises terms that result from decomposing the different conductor integrands into approximations.

5. The one or more non-transitory computer-readable storage media of claim 1, wherein the first set of terms includes one or more terms based on Gaussian quadrature rules, one or more terms derived by applying a polar coordinate system, or one or more terms corresponding to a polynomial interpolation.

6. The one or more non-transitory computer-readable storage media of claim 1, wherein the second set of terms includes one or more terms based on Gaussian quadrature rules, one or more terms corresponding to Taylor expansions, or one or more terms corresponding to a polynomial interpolation.

7. The one or more non-transitory computer-readable storage media of claim 1, wherein the method further comprises assigning at least some of the computed values for the one or more of the matrix elements corresponding to same conductor integrands to other matrix elements based on conduction mode symmetries.

8. A method, comprising:
with a computer,
loading circuit design information, the circuit design information indicating at least a geometric layout of conductors in a circuit design and a desired frequency of operation for the circuit design;
defining conduction modes representing distribution functions for currents in the conductors at the desired frequency of operation;
generating a conduction mode matrix, the conduction mode matrix including matrix elements based on the defined conduction modes, the matrix elements comprising matrix elements corresponding to same conductor integrands and matrix elements corresponding to different conductor integrands;
computing values for one or more of the matrix elements corresponding to same conductor integrands using a first set of terms;
computing values for one or more of the matrix elements corresponding to different conductor integrands using a second set of terms, the second set of terms being different than the first set of terms; and
storing the values for the one or more of the matrix elements corresponding to same conductor integrands and the values for the one or more of the matrix elements corresponding to different conductor integrands.

9. The method of claim 8, further comprising computing impedance values for each of the conductors by solving a matrix equation that includes the conduction mode matrix.

10. The method of claim 8, wherein the first set of terms comprises terms that result from decomposing the same conductor integrands into approximations.

11. The method of claim 8, wherein the second set of terms comprises terms that result from decomposing the different conductor integrands into approximations.

12. The method of claim 8, wherein the first set of terms includes one or more terms based on Gaussian quadrature rules, one or more terms derived by applying a polar coordinate system, or one or more terms corresponding to a polynomial interpolation.

13. The method of claim 8, wherein the second set of terms includes one or more terms based on Gaussian quadrature rules, one or more terms corresponding to Taylor expansions, or one or more terms corresponding to a polynomial interpolation.

14. The method of claim 8, further comprising assigning at least some of the computed values for the one or more of the matrix elements corresponding to same conductor integrands to other matrix elements based on conduction mode symmetries.

15. The method of claim 8, further comprising modifying the circuit design information based at least in part on impedance values computed from one or more of the stored values.

16. The method of claim 15, further comprising manufacturing a circuit using the modified circuit design.

* * * * *